(12) United States Patent
McCormack et al.

(10) Patent No.: US 10,686,684 B2
(45) Date of Patent: Jun. 16, 2020

(54) INDIVIDUAL APPLICATION FLOW ISOTOPE TAGGING WITHIN A NETWORK INFRASTRUCTURE

(71) Applicant: BANK OF AMERICA CORPORATION, Charlotte, NC (US)

(72) Inventors: Jim McCormack, Charlotte, NC (US); Gerard P. Gay, Seattle, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 282 days.

(21) Appl. No.: 15/802,171

(22) Filed: Nov. 2, 2017

(65) Prior Publication Data

US 2019/0132229 A1    May 2, 2019

(51) Int. Cl.
| | |
|---|---|
| *H04L 12/26* | (2006.01) |
| *G05B 19/406* | (2006.01) |
| *H04L 12/801* | (2013.01) |
| *G09F 3/00* | (2006.01) |
| *H04L 29/06* | (2006.01) |
| *B42D 25/405* | (2014.01) |
| *H04L 29/08* | (2006.01) |
| *H04L 12/24* | (2006.01) |

(52) U.S. Cl.
CPC ........ *H04L 43/0876* (2013.01); *B42D 25/405* (2014.10); *G05B 19/406* (2013.01); *G09F 3/00* (2013.01); *H04L 43/062* (2013.01); *H04L 47/34* (2013.01); *H04L 63/00* (2013.01); *H04L 67/12* (2013.01); *G05B 2219/40392* (2013.01); *H04L 41/5003* (2013.01); *H04L 43/00* (2013.01); *H04L 43/08* (2013.01); *H04L 43/10* (2013.01); *H04L 67/2833* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 5,907,709 A | 5/1999 | Cantey et al. | |
| 6,789,116 B1 * | 9/2004 | Sarkissian | H04L 29/06 370/235 |
| 6,826,698 B1 | 11/2004 | Minkin et al. | |
| 6,829,585 B1 | 12/2004 | Grewal et al. | |
| 7,120,647 B2 | 10/2006 | Venkatesh et al. | |
| 7,426,654 B2 | 9/2008 | Adams, Jr. et al. | |

(Continued)

*Primary Examiner* — James A Edwards
(74) *Attorney, Agent, or Firm* — Michael A. Springs; Moore & Van Allen PLLC; Vaidehi Bachoti

(57) ABSTRACT

Embodiments of the invention are directed to a system, method, or computer program product for individual application flow isotope tagging within a network infrastructure. In this regard, the invention is configured to construct a robotic process automation application structured to determine data flow associated with a first technology application within a myriad of data transmission flows between a plurality of network nodes of the network infrastructure. The invention configures a robotic process automation application for inserting a unique isotope tag string in data packets associated with first technology activity performed by the first technology application, prior to transmission from a source network node. The invention is configured to track, in real time, the current locations of the data packets among the multitude of data packets being transmitted in the network, based on the first unique isotope tag string.

20 Claims, 10 Drawing Sheets

(56) References Cited

U.S. PATENT DOCUMENTS

| | | |
|---|---|---|
| 7,431,202 B1 | 10/2008 | Meador et al. |
| 7,607,066 B2 | 10/2009 | Gertz et al. |
| 7,626,938 B1 | 12/2009 | Orr et al. |
| 7,680,809 B2 | 3/2010 | Deng et al. |
| 7,685,067 B1 | 3/2010 | Britto et al. |
| 7,752,554 B2 | 7/2010 | Biggs et al. |
| 7,861,252 B2 | 12/2010 | Uszok et al. |
| 7,882,394 B2 | 2/2011 | Hosek et al. |
| 7,937,624 B2 | 5/2011 | Qing et al. |
| 7,954,143 B2 | 5/2011 | Aaron |
| 7,966,654 B2 | 6/2011 | Crawford |
| 7,966,655 B2 | 6/2011 | Acharya et al. |
| 7,973,508 B2 | 7/2011 | Le |
| 8,014,726 B1 | 9/2011 | Petersen et al. |
| 8,065,719 B2 | 11/2011 | Yang |
| 8,082,471 B2 | 12/2011 | Khan |
| 8,099,774 B2 | 1/2012 | Abzarian et al. |
| 8,171,406 B1 | 5/2012 | Newstadt et al. |
| 8,285,643 B2 | 10/2012 | Isaacson et al. |
| 8,285,652 B2 | 10/2012 | Biggs et al. |
| 8,397,282 B2 | 3/2013 | Turley et al. |
| 8,407,670 B2 | 3/2013 | Hegde et al. |
| 8,418,240 B2 | 4/2013 | Wool |
| 8,448,139 B2 | 5/2013 | Ghosh |
| 8,508,336 B2 | 8/2013 | Giobbi et al. |
| 8,515,958 B2 | 8/2013 | Knight |
| 8,549,643 B1 | 10/2013 | Shou |
| 8,566,169 B2 | 10/2013 | Bohanan et al. |
| 8,700,414 B2 | 4/2014 | Rothermel et al. |
| 8,745,698 B1 | 6/2014 | Ashfield et al. |
| 8,751,559 B1 | 6/2014 | Richardson et al. |
| 8,793,578 B2 | 7/2014 | Mounty et al. |
| 8,819,825 B2 | 8/2014 | Keromytis et al. |
| 8,849,907 B1 | 9/2014 | Hession et al. |
| 8,935,673 B1 | 1/2015 | Ashkenazi et al. |
| 8,955,743 B1 | 2/2015 | Block et al. |
| 8,976,697 B2 | 3/2015 | Kalkunte |
| 9,024,993 B2 | 5/2015 | Hession et al. |
| 9,088,543 B2 | 7/2015 | Lemke et al. |
| 9,105,143 B1 | 8/2015 | Huggins et al. |
| 9,112,709 B1 | 8/2015 | Tofigh et al. |
| 9,135,615 B1 | 9/2015 | Mutha |
| 9,183,106 B2 | 11/2015 | Rao et al. |
| 9,195,739 B2 | 11/2015 | Imig et al. |
| 9,201,646 B2 | 12/2015 | Balachandran |
| 9,215,213 B2 | 12/2015 | Bansal et al. |
| 9,216,509 B2 | 12/2015 | Renkis |
| 9,280,406 B2 | 3/2016 | Ghosh |
| 9,311,632 B1 | 4/2016 | Dent |
| 9,356,942 B1 | 5/2016 | Joffe |
| 9,356,957 B2 | 5/2016 | Keromytis et al. |
| 9,378,064 B2 | 6/2016 | Dees, Jr. et al. |
| 9,383,973 B2 | 7/2016 | Villar et al. |
| 9,412,073 B2 | 8/2016 | Brandt et al. |
| 9,451,056 B2 * | 9/2016 | Assarpour ............ H04L 43/026 |
| 9,471,474 B2 | 10/2016 | Gurumurthy et al. |
| 9,530,129 B2 | 12/2016 | Lanc |
| 9,555,544 B2 | 1/2017 | Bataller et al. |
| 9,600,456 B2 | 3/2017 | Sriganesh et al. |
| 9,626,721 B2 | 4/2017 | Granbery |
| 9,632,771 B2 | 4/2017 | Toub |
| 9,660,959 B2 | 5/2017 | Hsu et al. |
| 9,665,467 B2 | 5/2017 | Angwin et al. |
| 9,667,596 B2 | 5/2017 | Halabi |
| 9,674,222 B1 | 6/2017 | Joffe |
| 9,686,186 B2 | 6/2017 | Liste et al. |
| 9,703,624 B2 | 7/2017 | Purushothaman et al. |
| 9,715,675 B2 | 7/2017 | Chakravarty et al. |
| 9,723,485 B2 | 8/2017 | Jones-McFadden |
| 10,437,984 B2 | 10/2019 | Votaw et al. |
| 2003/0046583 A1 | 3/2003 | Goldman et al. |
| 2004/0030931 A1 | 2/2004 | Chamandy et al. |
| 2006/0048218 A1 | 3/2006 | Lingafelt et al. |
| 2007/0016945 A1 | 1/2007 | Bassett et al. |
| 2012/0096557 A1 | 4/2012 | Britton et al. |
| 2013/0042298 A1 | 2/2013 | Plaza Fonseca et al. |
| 2014/0181968 A1 | 6/2014 | Ge et al. |
| 2014/0208419 A1 | 7/2014 | Chang et al. |
| 2015/0277406 A1 * | 10/2015 | Maturana ........... G05B 19/0423 700/83 |
| 2016/0048502 A1 | 2/2016 | Montenegro et al. |
| 2016/0080345 A1 | 3/2016 | Safruti et al. |
| 2016/0335016 A1 | 11/2016 | Kurian et al. |
| 2017/0173784 A1 | 6/2017 | Shah et al. |
| 2017/0228119 A1 | 8/2017 | Hosbettu et al. |
| 2017/0269972 A1 | 9/2017 | Hosabettu et al. |
| 2017/0270431 A1 | 9/2017 | Hosabettu et al. |
| 2017/0288943 A1 | 10/2017 | Plumb et al. |

* cited by examiner

INDIVIDUAL APPLICATION FLOW ISOTOPE TAGGING WITHIN A NETWORK INFRASTRUCTURE

FIELD OF THE INVENTION

The present invention is directed to network infrastructure monitoring and assessment. In particular, the present invention embraces a novel approach to tracking data transmissions between network nodes of a network infrastructure.

BACKGROUND

Entities typically employ various network architectures comprising modems, hubs, switches, routers, load balancers, network hosts, servers, proxy servers, input/output devices, network terminals and computers and the like. Typically, the devices in the network architecture run a plurality of technology applications for facilitating and performing a myriad of tasks and activities associated with the entity. These technology applications generate vast volumes of data flow across the network nodes. However, with existing network architectures, it is not possible to track data flows across the network nodes that are associated with a particular technology application, without which functioning of technology applications cannot be evaluated and mitigation steps cannot be implemented. There present invention provides a novel method of unique isotope tagging of individual data packets associated with each technology application, that are then leveraged to identify, precisely and in real time, not only data flows associated with individual technology applications, but also the particular activity or task component that they are associated with.

The previous discussion of the background to the invention is provided for illustrative purposes only and is not an acknowledgement or admission that any of the material referred to is or was part of the common general knowledge as at the priority date of the application.

SUMMARY

In one aspect, the present invention is directed to in general a system, method and computer program product for individual application flow isotope tagging within a network infrastructure. The system is configured to construct a robotic process automation application structured to determine data flow associated with a first technology application within the network infrastructure. The system typically includes an entity communication network comprising a plurality of network nodes. The system also includes a control system in operative communication with the entity communication network comprising: a first processor; a first memory device; and a robotic process automation (RPA) control application that is stored in the first memory device comprising computer readable instructions executable by the first processor to perform one or more functions described below. The system also includes a robotic process automation (RPA) device in operative communication with the control configuration apparatus and the entity communication network, the RPA device comprising: a second processor; a second memory device; and a robotic process automation (RPA) isotope tagging application that is stored in the second memory device comprising computer readable instructions executable by the second processor to perform one or more functions described below. That said, in some embodiments, the invention takes the form of a computer program product comprising one or more non-transitory computer-readable storage media having computer-executable instructions that when executed by one or more processing devices are configured to cause the one or more processing devices to perform one or more functions described below. In some embodiments, the invention takes the form of a method for performing one or more functions described below.

Typically, the invention, via the RPA control application is configured to: identify the plurality of network nodes of the entity communication network, wherein identifying the plurality of network nodes comprises determining the network architecture of the entity communication network; configure the robotic process automation (RPA) isotope tagging application for tagging and tracking data flow associated with a first technology application based on the network architecture; transmit, via a first operative communication link, the RPA isotope tagging application to the RPA device; and transmit a first control signal, via the first operative communication link, to the RPA isotope tagging application, the first control signal being structured to cause the first robotic process automation application to initiate the tagging and tracking of the data flow associated with the first technology application.

Moreover, the invention, via the RPA isotope tagging application is configured to: in response to the first control signal, identify a first data packet associated with a first technology activity of the first technology application, wherein the first data packet is structured to be transmitted from a source network node to a destination network node of the plurality of network nodes, via one or more intermediate network nodes of the plurality of network nodes; insert a first unique isotope tag string in at least one of a header element, a payload element, and a trailer element of the first data packet prior to transmission from the source network node of the plurality of network nodes; initiate transmission of the first data packet from the source network node of the plurality of network nodes to the destination network node of the plurality of network nodes; track, in real time, the data flow (also referred to as application flow) of the first technology application within network data flow of a plurality of applications of the entity communication network, wherein tracking comprises determining a current location of the first data packet based on the first unique isotope tag string; and present, on a display device, the current location of the first data packet in an application tracking user interface.

In another embodiment, and in combination with any of the previous embodiments, configuring the RPA isotope tagging application for tagging and tracking data flow associated with the first technology application comprises structuring the RPA isotope tagging application to utilize controls of an input device of the RPA device to interact with a first interface of the first technology application for converting the RPA device into a virtual workstation for the RPA isotope tagging application.

In another embodiment, and in combination with any of the previous embodiments, the RPA isotope tagging application is further configured to: identify a first network transmission path that is associated with transmitting the first data packet from the source network node to the destination network node via a first intermediate network node of the one or more intermediate network nodes; determine a current network performance characteristic associated with the first intermediate network node; and based on determining (i) that the current network performance characteristic associated with the first intermediate network node is outside of a predetermined threshold range;

(ii) that a data flow associated with the first technology activity of the first technology application comprising the first data packet causes, at least in part, the current network performance characteristic to occur at outside of the predetermined threshold range, re-route one or more second data packets associated with the first technology activity of the first technology application through a second intermediate network node of the plurality of network nodes that is not associated with the first network transmission path; wherein the second intermediate network node is associated with transmitting the one or more second data packets from the source network node to the destination network node via a second network transmission path.

In another embodiment, and in combination with any of the previous embodiments, the plurality of network nodes comprise one or more modems, one or more hubs, one or more switches, one or more routers, one or more load balancers, and one or more data terminal equipment devices.

In another embodiment, and in combination with any of the previous embodiments, the one or more data terminal equipment devices of the entity communication network comprise one or more of server devices, proxy servers, one or more computing devices, one or more data output devices, and/or one or more network hosts having corresponding unique network addresses.

In another embodiment, and in combination with any of the previous embodiments, configuring the RPA isotope tagging application, by the RPA control application, further comprises: identifying the first technology application of a plurality of source technology applications run by the source network node; identifying one or more technology activities performed by the first technology application that are associated with transmission of data packets between at least a portion of the plurality of network nodes of the entity communication network; and structuring the RPA isotope tagging application for inserting unique isotope tag strings into each of the data packets transmitted by the first technology application for performing the first technology activity of the one or more technology activities.

In another embodiment, and in combination with any of the previous embodiments, identifying, by the RPA isotope tagging application, the first data packet associated with the first technology activity of the first technology application, further comprises: identifying that the first technology activity is initiated by the first technology application at the source network node; identifying a first sequence of data packets associated with the first technology activity that are configured to be transmitted from the source network node; identify the first data packet of the first sequence of data packets based on analyzing a packet sequence number in the header element of the first data packet; insert the first unique isotope tag string in at least one of the header element, the payload element, and the trailer element of the first data packet prior to transmission from the source network node, wherein the first unique isotope tag string comprises: a first isotope portion comprising a unique identifier of the first technology application; a second isotope portion comprising a unique identifier of the first technology activity; and a third isotope portion comprising the packet sequence number of the first data packet.

In another embodiment, and in combination with any of the previous embodiments, the RPA isotope tagging application is further configured to: identify that an auxiliary technology activity is initiated by the first technology application at the source network node; identifying an auxiliary sequence of data packets associated with the auxiliary technology activity that are structured to be transmitted from the source network node; identify a third data packet of the auxiliary sequence of data packets based on analyzing a packet sequence number in the header element of the third data packet; insert a third unique isotope tag string in at least one of the header element, a payload element, and a trailer element of the third data packet prior to transmission from the source network node, wherein the third unique isotope tag string comprises: a first isotope portion comprising the unique identifier of the first technology application; a second isotope portion comprising an auxiliary unique identifier of the auxiliary technology activity; and a third isotope portion comprising the packet sequence number of the auxiliary data packet.

In another embodiment, and in combination with any of the previous embodiments, identifying, by the RPA isotope tagging application, the first data packet associated with the first technology activity of the first technology application, further comprises: receiving, from an input device, a user request to test the first technology activity of the first technology application; transmitting a activation control instruction structured for activating the first technology application at the source network node; transmitting an activity control instruction structured for causing the first technology application to perform the first technology activity, wherein transmitting the activity control instruction comprises transmitting, to the first technology application first technology activity input using controls of an input device of the source network node; identifying the first data packet of a first sequence of data packets associated with the first technology activity that is configured to be transmitted from the source network node; insert the first unique isotope tag string in at least one of the header element, the payload element, and the trailer element of the first data packet prior to transmission from the source network node.

In another embodiment, and in combination with any of the previous embodiments, transmitting, by the RPA isotope tagging application, the activity control instruction structured for causing the first technology application to perform the first technology activity further comprises: identify a first input data portion to be provided at first interface of the first technology application for performing the first technology activity at the source network node; identify an input device of a plurality of input devices of the source network node that is associated with the first input data portion; identify an input signal format associated with the input device; transform the first input data portion into the input signal format associated with the input device; and transmit, to the first technology application, input device control signals for the first input data in the input signal format for causing the first technology application to perform the first technology activity.

In another embodiment, and in combination with any of the previous embodiments, tracking, by the RPA isotope tagging application, application flow of the first technology application within the network data flow of the plurality of applications of the entity communication network, further comprises: identifying the one or more intermediate network nodes that are associated with transmitting the first data packet from the source network node to the destination network node based on identifying a network transmission path; identifying, at each of path network nodes of the plurality of network nodes one or more incoming data packets, wherein the path network nodes of the plurality of network nodes comprise the one or more intermediate network nodes, the destination network node and the source network node; parsing, at a first network node of path network nodes, each of the one or more incoming data packets to identify a unique isotope tag string of the data packet; based on identifying that the unique isotope tag string of a first incoming data packet of the one or more incoming data packets at the first network node of path network nodes matches the first unique isotope tag string, determining that the current location of the first data packet is the first network node of path network nodes.

In another embodiment, and in combination with any of the previous embodiments, identifying, by the RPA isotope tagging application, that the unique isotope tag string of the first incoming data packet of the one or more incoming data packets at the first network node of path network nodes matches the first unique isotope tag string, further comprises: identifying that (i) a first isotope portion of the unique isotope tag string of the first incoming data packet matches a unique identifier of the identifier of the first technology application, and (ii) a second isotope portion of the unique isotope tag string of the first incoming data packet matches a unique identifier of the first technology activity.

In another embodiment, and in combination with any of the previous embodiments, presenting, by the RPA isotope tagging application, the current location of the first data packet in the application tracking user interface, further comprises: identifying the one or more intermediate network nodes that are associated with transmitting the first data packet from the source network node to the destination network node based on identifying a network transmission path; constructing a graphical representation of at least a portion of the network architecture of the entity communication network comprising at least the source network node, the destination network node and the one or more intermediate network nodes; presenting the graphical representation of the at least a portion of the network architecture on a display device, wherein presenting comprises overlaying a graphical path element associated with the network transmission path on the graphical representation of the at least a portion of the network architecture; and overlaying a data packet element associated with the first data packet, proximate a representation of a first network node associated with the current location of the first data packet on the graphical representation of the at least a portion of the network architecture.

In another embodiment, and in combination with any of the previous embodiments, the RPA isotope tagging application is further configured to: identify that the current location of the first data packet has changed from the first network node to subsequent second network node associated with the network transmission path; and modify, in real time, a spatial position of the data packet element associated with the first data packet such that the data packet element is proximate a representation of a second network node on the graphical representation of the at least a portion of the network architecture.

In another embodiment, and in combination with any of the previous embodiments, determining the network architecture of the entity communication network by the RPA control application further comprises identifying data communication links between the plurality of nodes and unique network addresses of the plurality of network nodes for operative communication using the data communication links.

In another embodiment, and in combination with any of the previous embodiments, determining the network architecture of the entity communication network by the RPA control application, further comprises: identifying a physical layer of the network architecture of the entity communication network, comprising identifying networking hardware transmission protocols for transmission of bit streams physical links of the data communication links between the plurality of nodes; identifying a data link layer of the network architecture of the entity communication network, comprising identifying networking transmission protocols for frame synchronization, logical link control and media access control associated with the data communication links between the plurality of nodes, wherein identifying the data link layer comprises identifying media access control (MAC) addresses of at least a portion of the plurality of nodes; identifying a network layer of the network architecture of the entity communication network, comprising identifying data packet forwarding and routing protocols associated with the data communication links between the plurality of nodes, wherein identifying the network layer comprises identifying internet protocol (IP) addresses of at least a portion of the plurality of nodes; and identifying a transport layer of the network architecture of the entity communication network, comprising identifying host-to-host communication protocols for technology applications associated with at least a portion of the plurality of nodes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
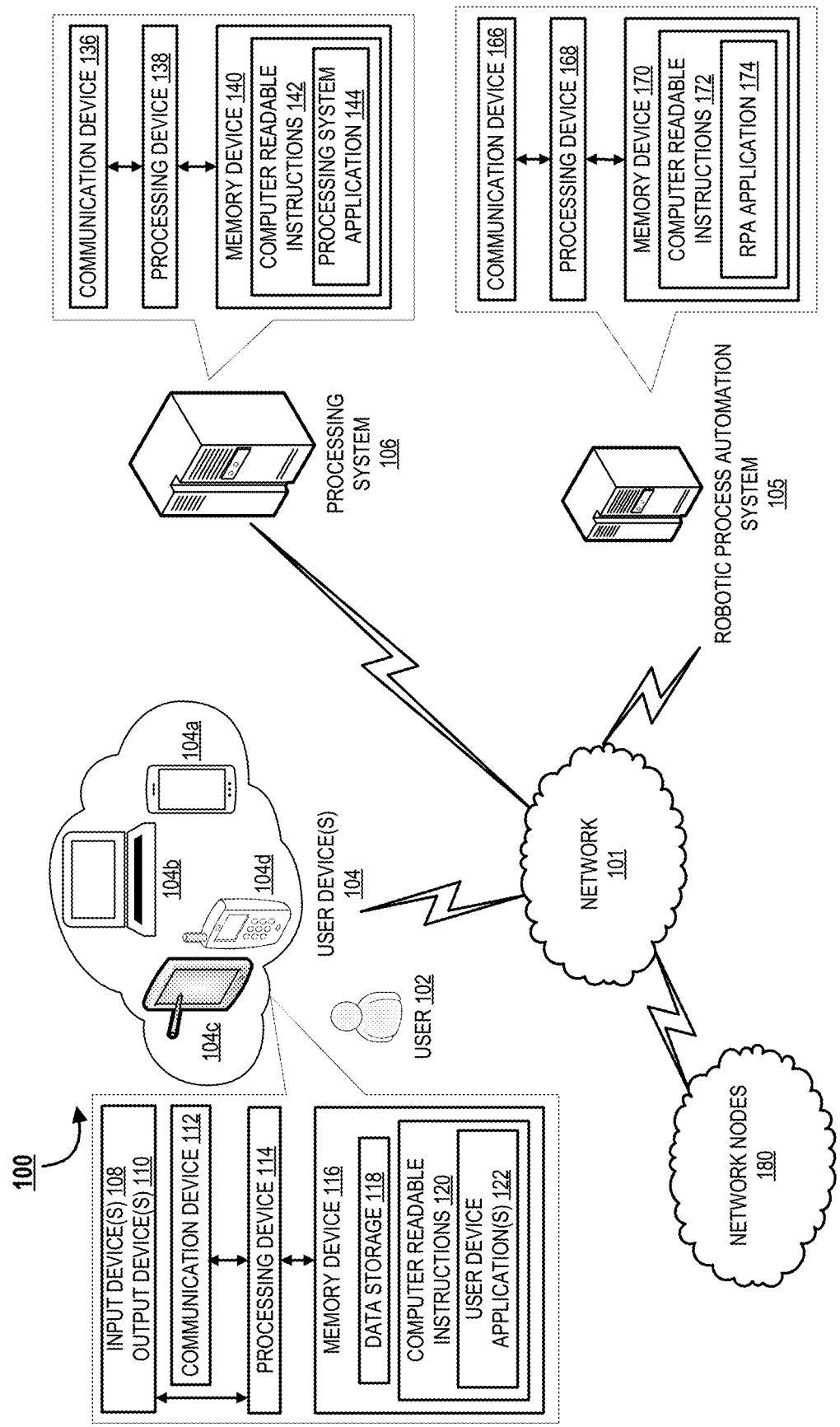
Figure 2:
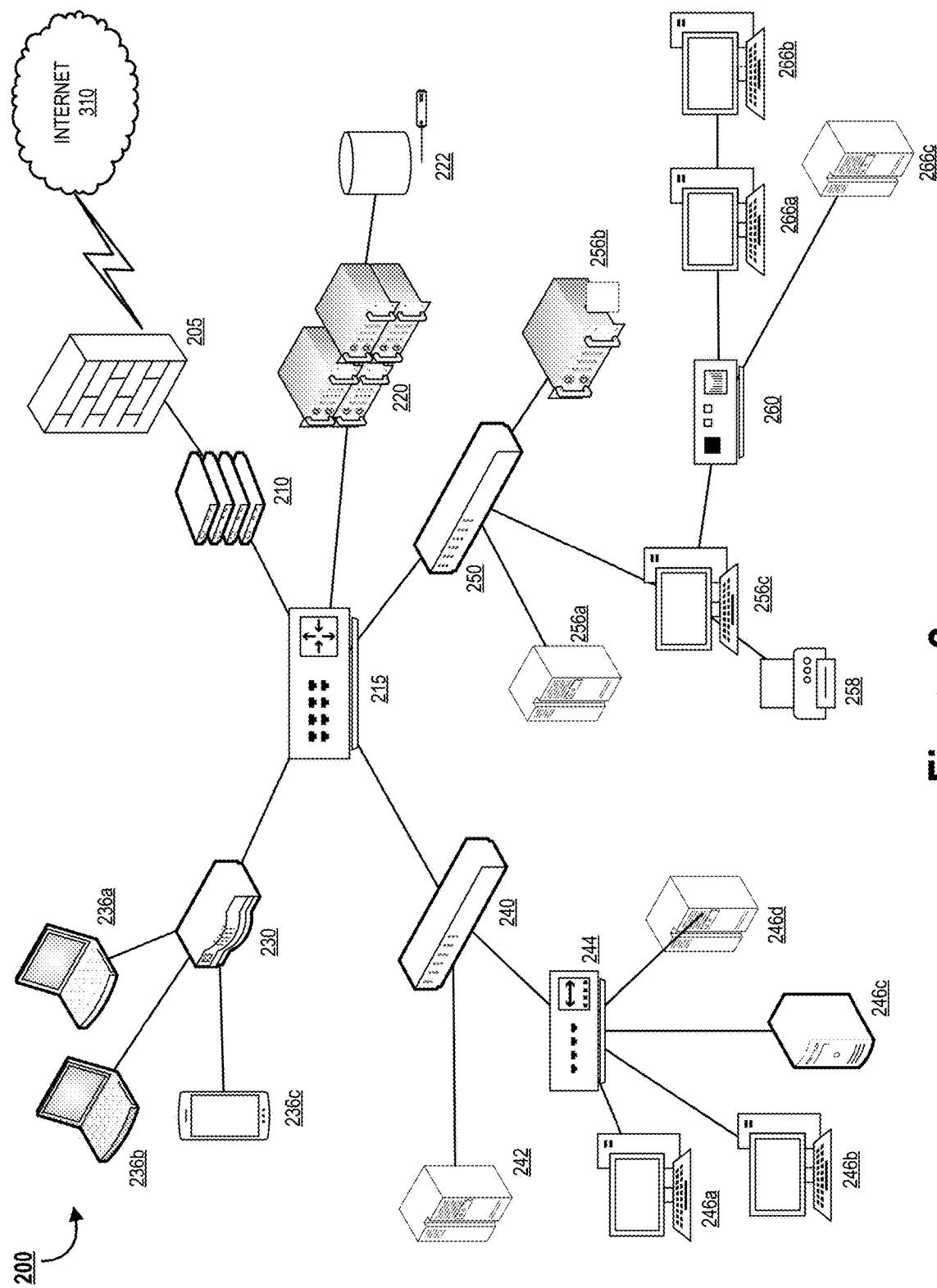
Figure 3:
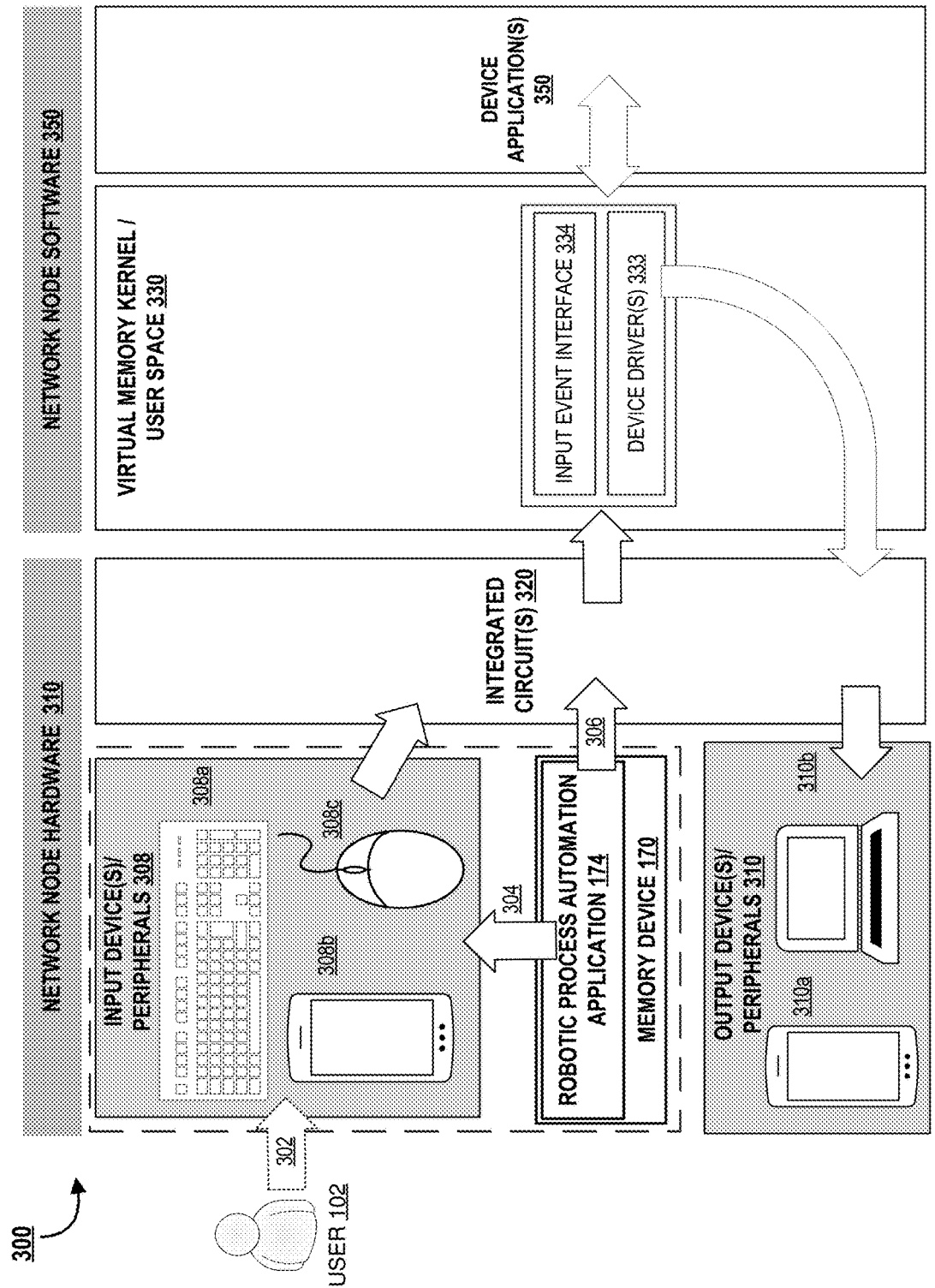

Having thus described embodiments of the invention in general terms, reference will now be made the accompanying drawings, wherein:

FIG. 1 depicts a system environment 100 individual application flow isotope tagging within an entity network infrastructure, in accordance with an aspect of the present invention;

FIG. 2 depicts an entity communication network environment 200, in accordance with one embodiment of the present invention FIG. 3 depicts a schematic user device and high level process flow 300 for converting the user device into a virtual workstation in accordance with an aspect of the invention.

Figure 4:
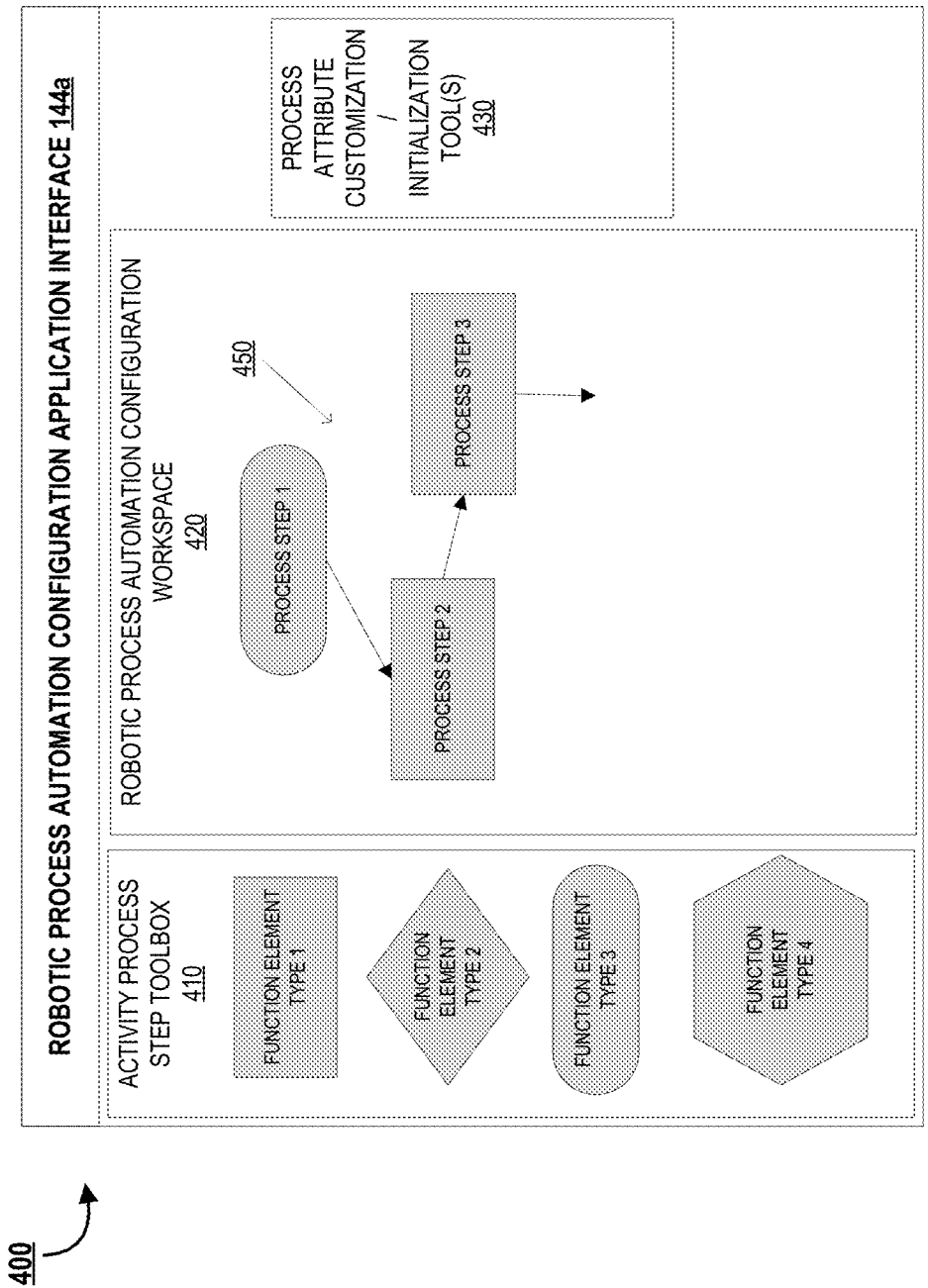
Figure 5:
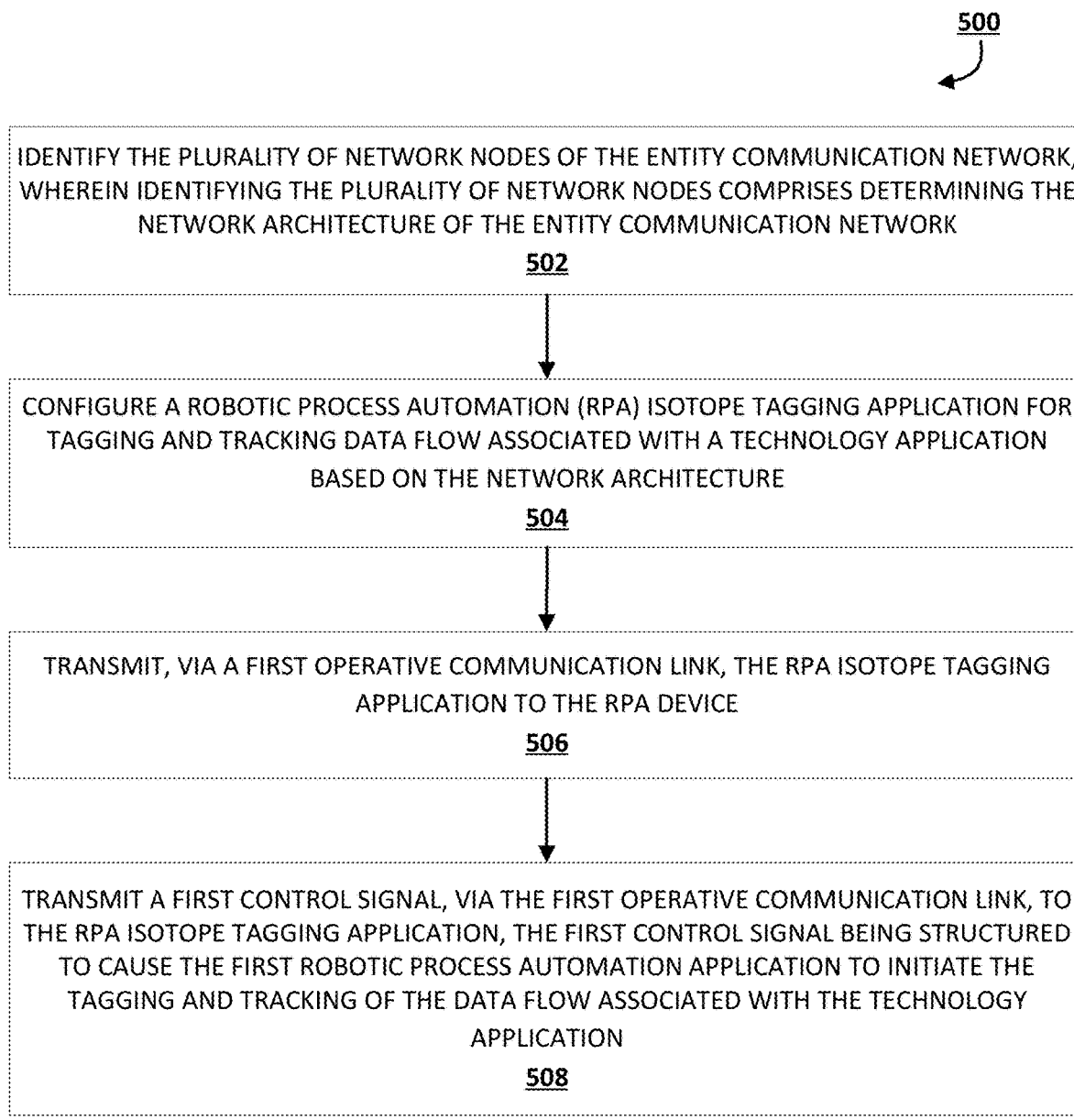
Figure 6:
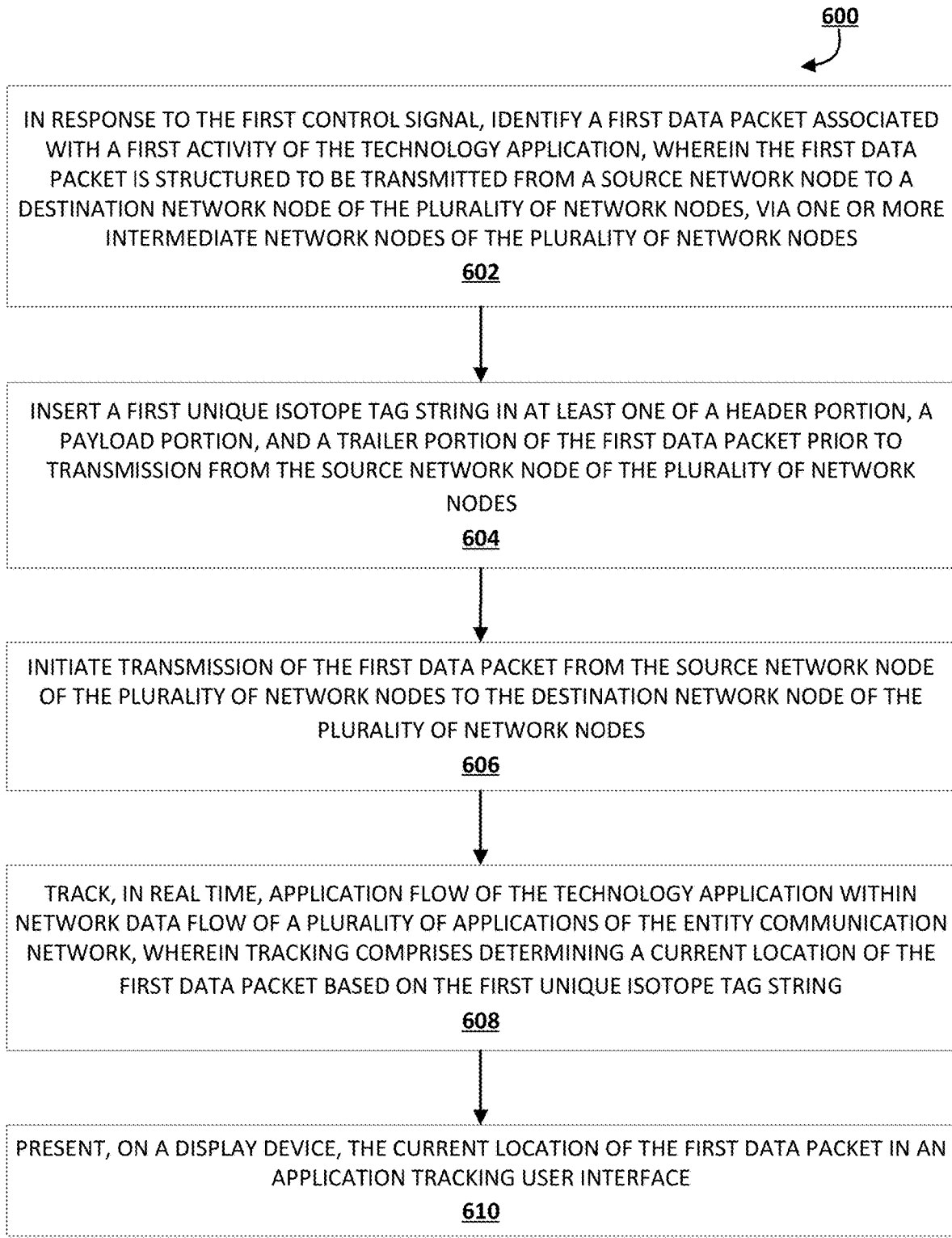
Figures 7A, 7B:
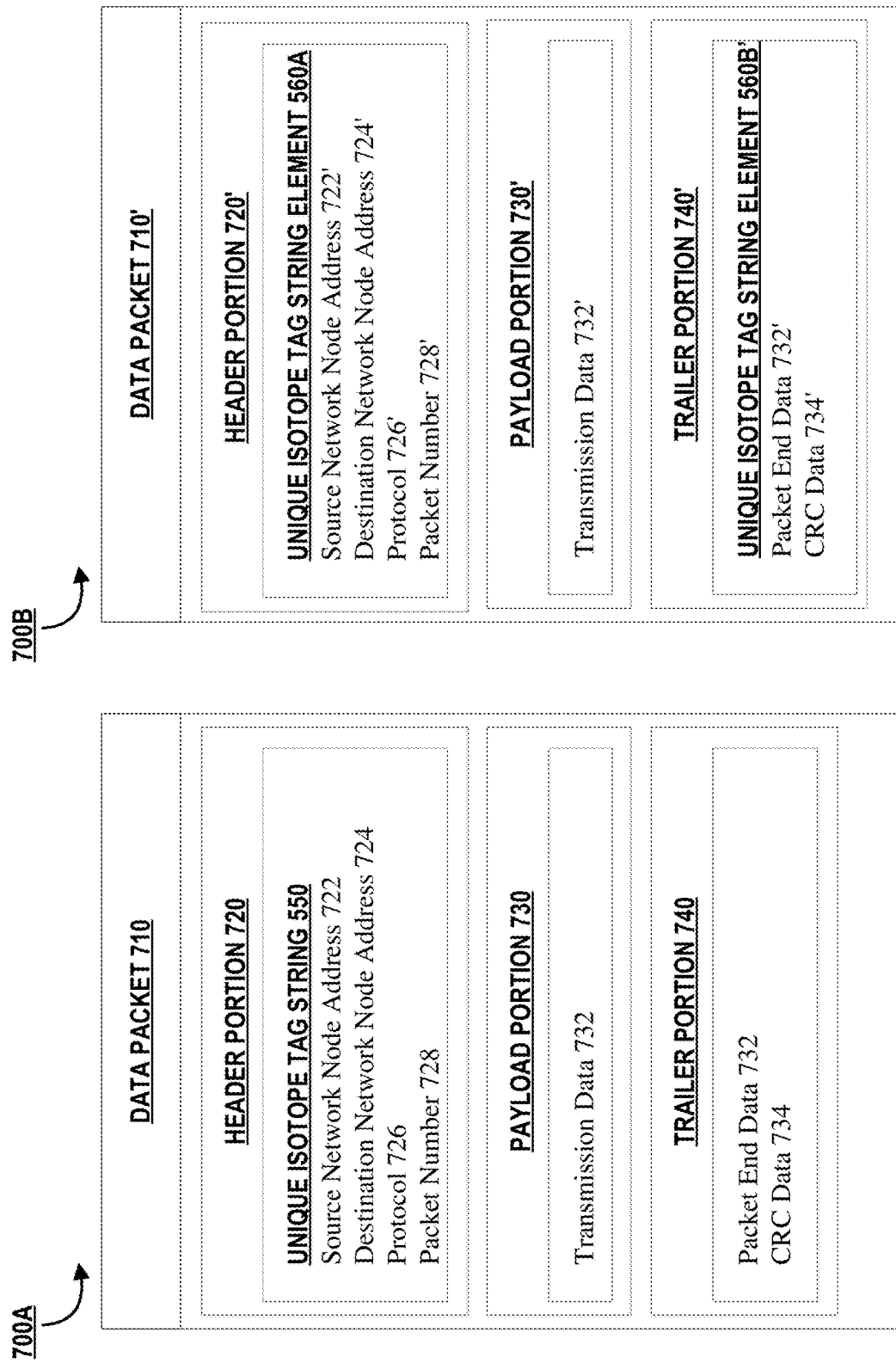
Figure 8A:
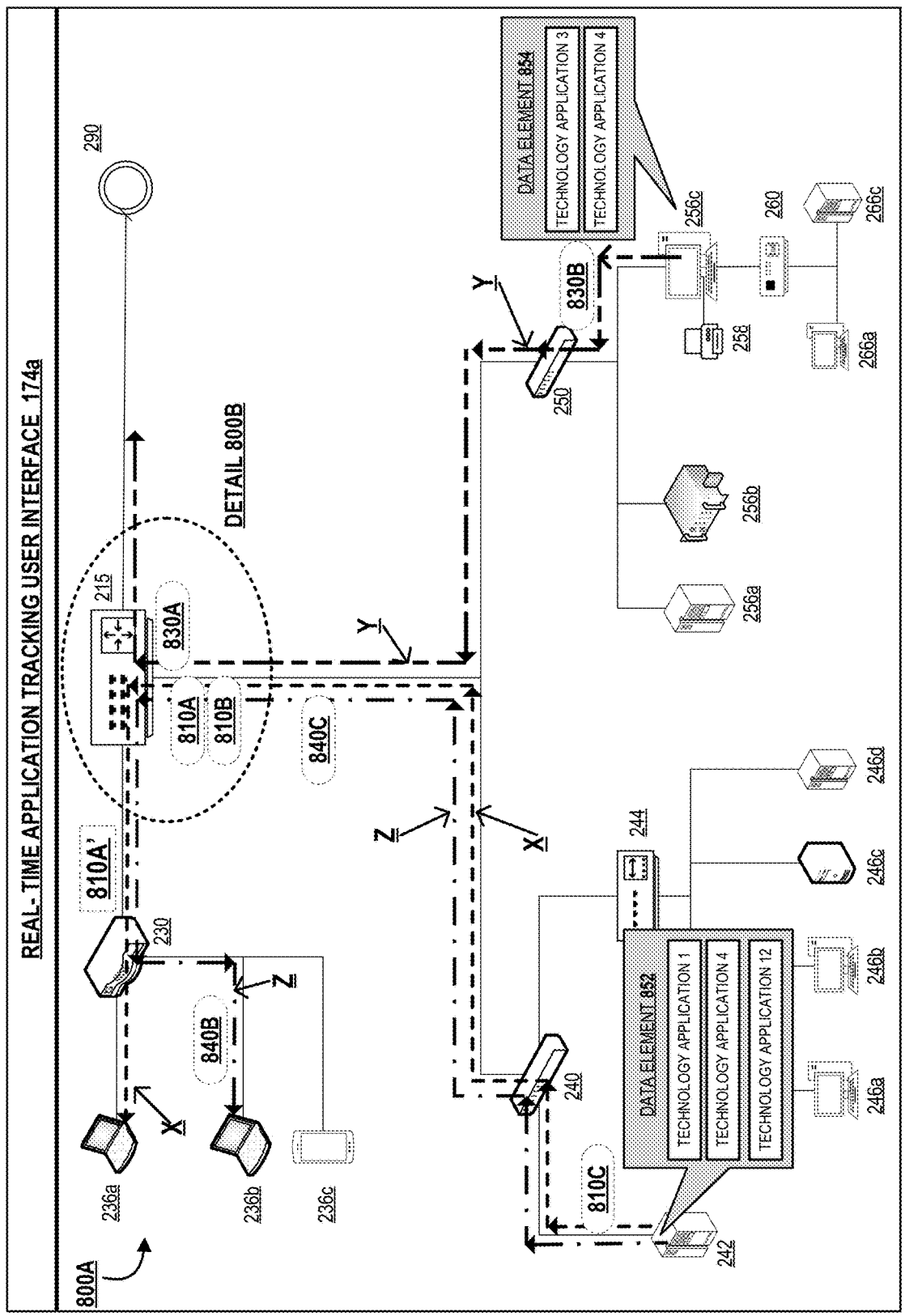
Figure 8B:
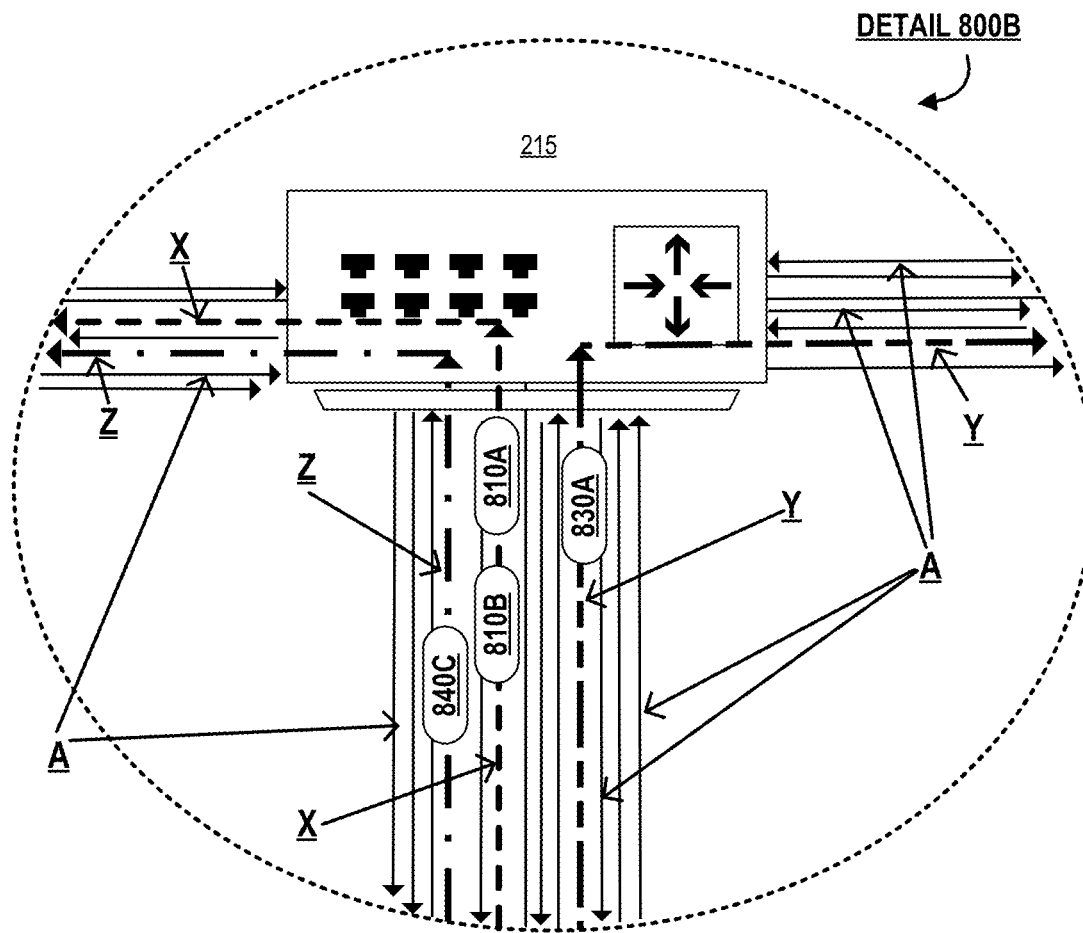
Figure 8C:
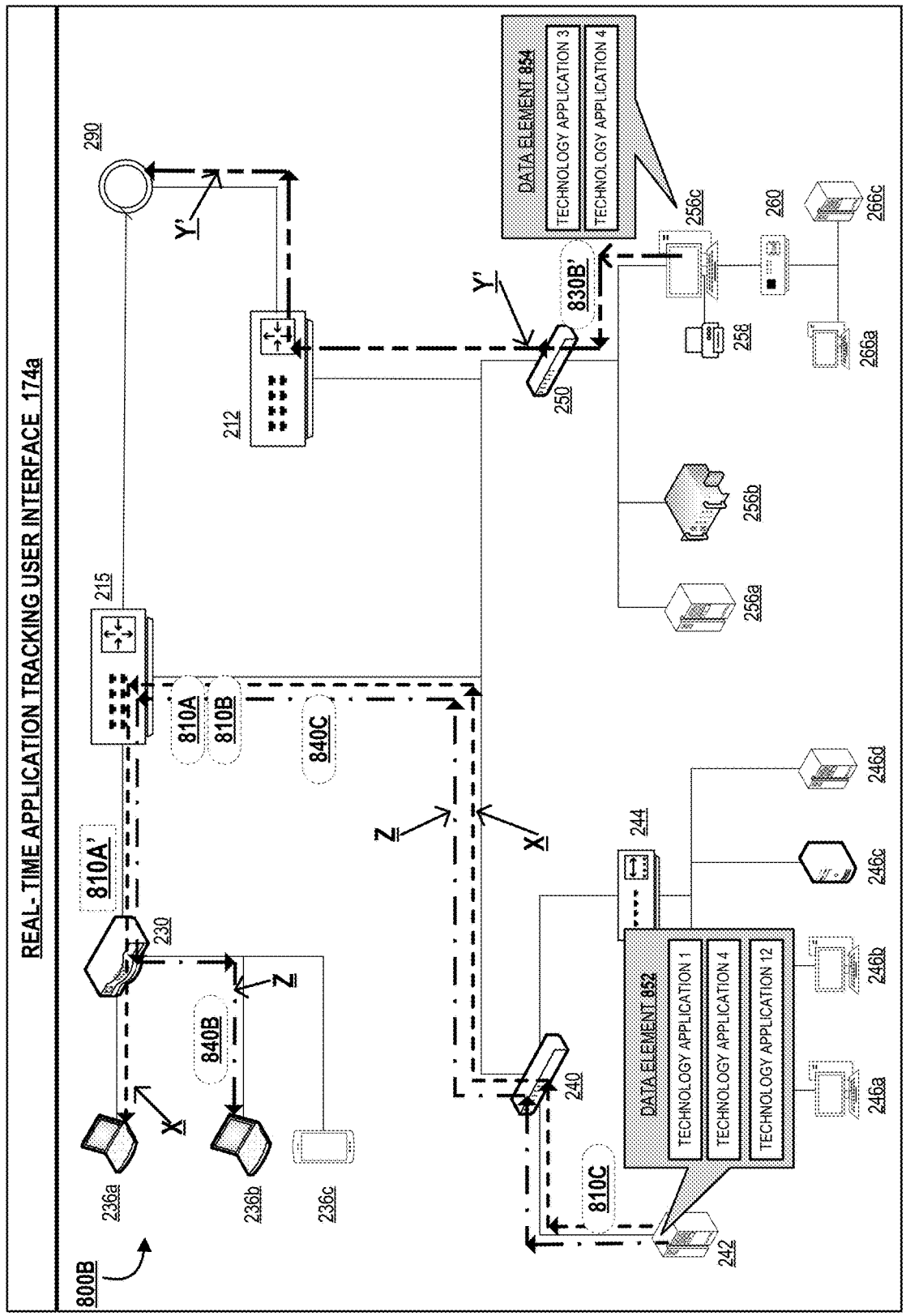

FIG. 4 schematically depicts a high level robotic process automation configuration application interface 400, in accordance with an aspect of the invention;

FIG. 5 schematically depicts a high level process flow 500 for individual application flow isotope tagging within a network infrastructure, in accordance with an aspect of the invention;

FIG. 6 schematically depicts a high level process flow 600 for individual application flow isotope tagging within a network infrastructure, in accordance with an aspect of the invention;

FIG. 7A illustrates a schematic representation 700A of a data packet, in accordance with some embodiments of the invention;

FIG. 7B illustrates a schematic representation 700B of a data packet, in accordance with some embodiments of the invention;

FIG. 8A illustrates a schematic representation 800A of a real-time application tracking user interface, in accordance with some embodiments of the invention;

FIG. 8B illustrates a detail view 800B of the real-time application tracking user interface of FIG. 8A, in accordance with some embodiments of the invention; and FIG. 8C illustrates a schematic representation 800C of a real-time application tracking user interface, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be an organization, a company, a group, an institution, a society, an association, an establishment or the like, (e.g., a financial institution, a business concern, a merchant organization, etc.). For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user information, or the like. The account is associated with and/or maintained by an entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building or a dwelling, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

"Robotic process automation" or "RPA" as used herein may refer to the automation of high-volume processes using bots.

"Robotic Process Automation Application," "RPA Bot" or "Bot" as used herein may refer to a dedicated infinitely customizable software application, typically configured for a dedicated workstation that performs automated tasks. In particular, a plurality of bots may be used by an entity to perform various functions for high-volume applications that relate to the entity's objectives to utilized existing third party applications and their interfaces, even if access to their data layer/application layer code is not available. Typically, a bot will be configured to repeatedly perform a specific task. Each bot may be configured to utilize particular protocols and be compatible with particular platforms and applications. In some embodiments, a bot may be configured to execute its tasks by interacting with other applications within the entity's systems at the interface level (i.e. by providing inputs to the interfaces of the other applications).

With advancements in technology infrastructures and wireless communication implementation, entities increasingly employ various network architectures comprising modems, hubs, switches, routers, load balancers, network hosts, servers, proxy servers, input/output devices, network terminals and computers and the like. Typically, the devices in the network architecture run a plurality of technology applications for facilitating and performing a myriad of tasks and activities associated with the entity. These technology applications generate vast volumes of data flow across the network nodes. However, with existing network architectures, it is not possible to track data flows across the network nodes that are associated with a particular technology application, without which functioning of technology applications cannot be evaluated and mitigation steps cannot be implemented. There present invention provides a novel method of unique isotope tagging of individual data packets associated with each technology application, that are then leveraged to identify, precisely and in real time, not only data flows associated with individual technology applications, but also the particular activity or task component that they are associated with.

The present invention provides a solution to the foregoing problems by providing individual application flow isotope tagging within a network infrastructure. However, one technical problem encountered for implementing this solution is that these existing technology applications for running technology activities associated with the entity are typically operated via user interfaces for receiving input, and the internal code of these existing applications on the user device, especially third-party applications, does not lend themselves for automated operation by external applications. Even if it were possible, automatic execution of input commands to an existing user interface would entail an extremely time consuming and expenditure intensive conversion of the internal code of the user interface of the user device application into a machine-to-machine form of data layer communication and creation of a new program to perform the functions, and would require immense in-depth technical skill and knowledge of application programming for a specialist operator of an entity to code the conversion application. The present invention solves this technical problem by utilizing the user interfaces of the existing user applications themselves, which are readily available to the user by assuming controls of input devices, without requiring the non-feasible and time intensive coding of a new machine-to-machine form program. The present invention is configured to automatically execute input functions of the user interface of the existing application using the controls of the user input devices for inserting unique isotope tag strings data packets prior to transmission by the technology application and subsequently tracking application flow of the particular technology activity being performed by the first technology application, within network data flow of a plurality of applications of the entity communication network.

In addition, in another aspect, the present invention allows for extremely quick and easy structuring of an infinitely customizable robotic process automation (RPA) application for utilizing controls of the user input devices. This RPA application can be configured by an individual associated with an entity or the user, using an intuitive interface, without requiring technical expertise. Hence, the present invention is structured to operate existing user interfaces of existing user device applications, even if the device is not being operated upon by the user, individual application flow isotope tagging within a network infrastructure in real-time. As discussed, embodiments of the present invention address the above needs and/or achieve other advantages by providing apparatuses (e.g., a system, computer program product and/or other devices) and methods for individual application flow isotope tagging within a network infrastructure, as will be described in detail below.

FIG. 1 illustrates a system environment 100 for individual application flow isotope tagging within an entity network infrastructure, in accordance with one embodiment of the present invention. FIG. 1 provides a unique system that includes specialized servers and systems, communicably linked across a distributive network of nodes required to perform the functions of testing data transmission characteristics of the entity communication network and evaluating data flows associated in individual applications, in real-time or near real-time. As illustrated in FIG. 1, a robotic process automation (RPA) system 105 (also referred to as the device 105, the system 105 or "the RPA system" in some instances) is operatively coupled, via a network 101 to the user system(s) 104 (e.g., a plurality of user devices 104a-104d), to the processing system 106 (also referred to as a control system 106) and to a plurality of other network nodes. In this way, the robotic process automation system 105 can send information to and receive information from the user device(s) 104, the processing system 106 (e.g., a financial institution server) and the plurality of network nodes 180. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and structured for facilitating data flows associated with activities and tasks associated with the entity. The network 101 may also be a global area network (GAN), such as the Internet (301, illustrated in FIG. 2), a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves, light waves or any other suitable means. In some embodiments, at least a portion of the network 101 is an entity communication network 200 associated with the entity, illustrated in FIG. 2.

In some embodiments, the robotic process automation system 105 and the plurality of network nodes 180, together with the processing system 106 and/or one or more of the user devices 104, constitute the entity communication network 200, each forming a network node of the entity communication network 200. That said, in other embodiments, it is envisaged that the entity communication network 200 comprises the plurality of network nodes 180 which interact with the robotic process automation system 105, the processing system 106 and/or one or more of the user devices 104 that are external to the entity communication network 200. Typically, the network nodes (e.g., the network nodes 180, the RPA system 105, the processing system 106, and/or the user device(s) 104) of the entity communication network 200 comprise operative communication channels for communicating with each other, in accordance with the network architecture of the entity communication network, as will be described with respect to FIG. 2. The operative transformation of the inherent functions of a network node (e.g., RPA system 105, user device 104 etc.) for converting the network node (e.g., RPA system 105, user device 104 etc.) into a virtual workstation by the present invention (via the processing system 106) is described with respect to FIG. 3, later on.

In some embodiments, the user 102 is an individual that has, owns or is otherwise associated with one or more user devices 104, and typically a plurality of user devices 104, that facilitate/allow the user to perform one or more user activities. The user devices typically comprise one or more of a smart phone 104a, a laptop or desktop computer 104b, a mobile phone or a personal digital assistant 104d, a tablet device 104c, wearable smart devices, smart television devices, home controllers, smart speakers, and/or other computing devices. In some embodiments, the user may be associated with a first user device (e.g., the tablet device 104c, a laptop or desktop computer 104b, or another smart/computing device) and a second user device (e.g., the smart phone 104a, or any of the user devices listed above).

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, a memory device 116, input device(s) 108 and output device(s) 105. The user device 104 may comprise other devices that are not illustrated, configured for location determination/navigation (GPS devices, accelerometers and other positioning/navigation devices), for authentication (fingerprint scanners, microphones, iris scanners, facial recognition devices/software and the like), for image capture (cameras, AR devices, and the like), for display (screens, hologram projectors and the like), and other purposes. The user device 104 is a computing system that enables the user to perform one or more user activities or tasks associated with the entity. The processing device 114 is operatively coupled to the communication device 112, input device(s) 108 (e.g., keypads/keyboards 108a, touch screens 108b, mouse/pointing devices 108c, gesture/speech recognition sensors/devices, microphones, joysticks, authentication credential capture devices listed above, image capture devices, and other peripheral input devices), output device(s) 110 (screens 110a-110b, speakers, printers and other peripheral output devices) and other devices/components of the user device. The processing device 114 uses the communication device 112 to communicate with the network 101 and other devices on the network 101, such as, but not limited to the processing system 106, the RPA system 105 and the network nodes 180. As such, the communication device 112 generally comprises a modem, server, or other device for communicating with other devices on the network 101.

Each user device 104a-104d, typically comprises one or more user input devices 108, that are configured to receive instructions, commands, data, authentication credentials, audio/visual input and other forms of user input from the user, and transmit the received user input to the processing device 114 of the user device for processing. Similarly, each user device 104a-104d, typically comprises one or more user output devices 110, that are configured to transmit, display (e.g., via a graphical user interface), present, provide or otherwise convey an user output to the user, based on instructions from the processing device 114 of the user device. In some embodiments, the one or more user input devices 108 and/or one or more user output devices 110 are dual-function devices that are configured to both receive user input from the user and display output to the user (e.g., a touch screen display of a display device). For example, the dual function input devices 108 and/or the output devices 110 may present a user interface associated with one or more user device applications 112 (e.g., a graphical user interface) that is configured to receive user input and also provide user output.

The user device 104 comprises computer-readable instructions 120 and data storage 118 stored in the memory device 116, which in one embodiment includes the computer-readable instructions 120 of one or more user applications 122 (e.g., technology applications such as operating system applications, device applications, third party applications, browser applications, network applications, and the like) that facilitate performance of one or more activities associated with the entity. In some embodiments, the first device application of the one or more user applications 122 refers to an application stored on the user device that is configured to receive user instructions/input via an associated first user interface, and in accordance with the user input perform one or more tasks or activities and associated steps (e.g., requesting information, retrieving/receiving information, perform searches, query other applications/servers, and/or the like) whose data flow through the network is desired to be evaluated in real-time or near real-time. For example, the first technology application may be structured to perform a first type of network activity (e.g., Website front end activities, entity logic middleware activities, server-less activities, Queueing activities, Caching activities, Database activities, DNS, Proxy, Firewall and other activities) associated with the entity.

As discussed, in some embodiments, the user device 104 may refer to multiple user devices that may be configured to communicate with the RPA system via the network 101. In some embodiment, the robotic process automation system 105, the processing system and/or the network nodes 180 may transmit control signals to the user device, configured to cause the technology application 122 to perform one or more functions or steps associated with testing data transmission characteristics of the entity communication network and evaluating data flows associated in individual applications, in real-time or near real-time.

As further illustrated in FIG. 1, the robotic process automation system 105 (also referred to as the RPA system 105) generally comprises a communication device 166, at least one processing device 168, and a memory device 170. As used herein, the term "processing device" or "processor" (e.g., processing devices 114, 138, 168 and 148) generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 168 is operatively coupled to the communication device 166 and the memory device 170. The processing device 168 uses the communication device 166 to communicate with the network 101 and other devices on the network 101, such as, but not limited to the processing system 106, the user system 104 and the network nodes 180. As such, the communication device 166 (and/or communication devices 112, 136, and 146) generally comprises a modem, server, or other device for communicating with other devices on the network 101.

As further illustrated in FIG. 1, the robotic process automation system 105 comprises computer-readable instructions 172 stored in the memory device 170, which in one embodiment includes the computer-readable instructions 172 of a robotic process automation application 174 (also referred to as an RPA application), typically structured and configured by the processing system 106. In some embodiments, the memory device 170 includes data storage 171 (not illustrated) for storing data related to the system environment, but not limited to data created and/or used by the robotic process automation application 174. In some embodiments, the robotic process automation application 174 is configured for testing data transmission characteristics of the entity communication network and evaluating data flows associated in individual applications, in real-time or near real-time, by the processing system application 144 (also referred to as the RPA control application) of the processing system 106 (also referred to as a control system 106). Specifically, executing computer readable instructions of 172 of the RPA application 174 is configured to cause processing device 168 to transmit certain control instructions to the one or more network nodes to cause their respective processing devices to carry out one or more steps described herein (e.g., with respect to FIGS. 4-5). Here, the processing system application 144 (also referred to as the RPA control application) of the processing/control system 106 is structured to configure a configure a robotic process automation application 174 for testing data transmission characteristics of the entity communication network and evaluating data flows associated in individual applications, in real-time or near real-time by converting the RPA system 105 (or another network node) into a virtual workstation, among other steps described herein. The robotic process automation configuration system 105 may communicate with the processing/control system 106, the user device 104, the network nodes 180, merchant systems and other third party systems (not illustrated) to perform one or more steps described herein, and/or cause these systems to perform one or more of these steps, at least in part.

In some embodiments, the robotic process automation configuration application 172 may control the functioning of the user device 104 and/or other network nodes 180. In some embodiments, the robotic process automation application 174 comprises computer readable instructions 172 or computer-readable program code, the when executed by the processing device 168, causes the processing device to perform one or more steps involved in individual application flow isotope tagging and/or to transmit control instructions to other systems and devices to cause the systems and devices to perform specific tasks. In some embodiments, the RPA system 105 and the processing system 106 may be embodied in the same system, or alternatively, the RPA system 105 and the processing system 106 may be separate systems as illustrated by FIG. 1.

Moreover, as illustrated in FIG. 1, the processing system 106 or control system 106 (also referred to as a entity system or a financial institution system 106) is connected to the RPA system 105 and the network nodes 180 and is associated with an entity network, and is an overarching system that is structured to configure the RPA application 174 for converting the RPA system 105 into a dedicated workstation. In this way, while only one processing system 106 is illustrated in FIG. 1, it is understood that multiple network systems may make up the system environment 100. The processing system 106 generally comprises a communication device 136, a processing device 138, and a memory device 140. The processing system 106 comprises computer-readable instructions 142 stored in the memory device 140, which in one embodiment includes the computer-readable instructions 142 of a processing system application 144 (also referred to as the RPA control application). These devices are similar in structure and functions as those described above. The processing system 106 may communicate with an authentication system 107 (not illustrated) to provide authentication credentials for user activities.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates an entity communication network environment 200, in accordance with one embodiment of the present invention. As discussed, in some embodiments, the robotic process automation system 105 and the plurality of network nodes 180, together with the processing system 106 and/or one or more of the user devices 104, constitute the entity communication network 200, each forming a network node of the entity communication network 200. That said, in other embodiments, it is envisaged that the entity communication network 200 comprises the plurality of network nodes 180 which interact with the robotic process automation system 105, the processing system 106 and/or one or more of the user devices 104 that are external to the entity communication network 200. Typically, the network nodes (e.g., the network nodes 180, the RPA system 105, the processing system 106, and/or the user device(s) 104) of the entity communication network 200 comprise operative communication channels for communicating with each other, in accordance with the network architecture of the entity communication network. In some embodiments, the entity communication network 200 has network nodes comprising physical nodes/devices and/or virtual nodes such as software (e.g., for routing, switching and other data flow operations), such that at least a portion of the network 200 is virtualized with software. In some embodiments, the entity communication network 200 comprises a cloud computing network.

As illustrated by FIG. 2, the entity communication network 200 comprises a plurality of nodes (e.g., 205 to 266). Some or all of the nodes 205-266 described herein may refer to the plurality of nodes 180. Moreover, the entity communication network 200 is typically in communication with an external communication network, such as the internet 310 or another network 310 (e.g., an ISP network). The entity communication network 200 comprises a network security node 205, such as a firewall 205, that monitors and controls incoming and outgoing network traffic based on predetermined security rules. The network security node may be in operative communication with one or more network nodes 210 structured for modulating one or more carrier wave signals to encode digital information for transmission and demodulating signals to decode the transmitted information, such as modem(s) 210. The entity communication network 200 further comprises one or more network nodes 215 that are configured for traffic routing and data packet forwarding, such as router(s) 215. The router node 215 may be in operative communication with other network nodes such as, access point node(s) 230 (e.g., wireless access point 230), proxy servers, switches (240, 250), server systems 220 (e.g., processing system 106, RPA system 105, etc.), and the like. The wireless access point 230, typically is a networking hardware device that allows Wi-Fi or NFC compatible data terminal equipment devices (DTEs) or computing devices 236a-236c (e.g., user devices 104 such as computers, smartphones, PDAs, smart devices, etc.) to connect to a wired network. The server systems 220 (e.g., processing system 106, RPA system 105, etc.) may be in operative communication with database systems or database server nodes 222.

The network switch nodes (240, 250) (also called switching hubs, bridging hubs, or MAC bridges) are computer network devices/nodes that connect other devices/nodes of the network together, by using packet switching to receive, process and forward data to a destination device/node. In some embodiments, the network switch nodes (240, 250) are multi-port network bridges that use unique network hardware addresses (e.g., MAC addresses of the devices/nodes such as the data terminal equipment devices) to process and forward data at a data link layer (described later on) of the entity communication network 200. In some embodiments, the network switch nodes (240, 250) are multilayer switches that also process data at a network layer by additionally incorporating routing functionality. As illustrated by FIG. 2, the network switch 240 may connect other data terminal equipment (DTEs) devices/nodes such as server devices 242 (e.g., processing system 106, RPA system 105 etc.) and a hub 244 which in turn connects nodes such as 246a-246d (e.g., processing system 106, RPA system 105, user devices 104, other DTEs etc.). The hub 244 may be an Ethernet hub, active hub, network hub, repeater hub, multiport repeater or another network switch. The network switch 250 may connect network nodes such as a server 256a, a proxy server 256b, a computing device 256c, etc. The computing device 256c may in turn be operatively connected to other nodes such as a printer terminal 258 and a network bridge 260. The network bridge 260 is a computer networking device that creates a single aggregate network from multiple communication networks or network segments, such as the nodes 266a-b (e.g., computing devices or other DTEs) and the node 266c (e.g., a server or other DTEs), as illustrated. The entity communication network 200 may further comprise one or more load balancers (not illustrated).

As such, the entity communication network 200 comprises a plurality of nodes such as one or more of: one or more modems, one or more hubs, one or more switches, one or more routers, one or more load balancers, and one or more data terminal equipment devices, cloud service virtual machines, VPN Gateways, traffic manager nodes, SQL servers, etc., as desired, in any suitable configuration and arrangement. The DTEs typically comprise unique network addresses (e.g., hardware addresses such as media access control (MAC) addresses, network addresses such as internet protocol (IP) addresses), such as server devices, proxy servers, one or more computing devices, one or more data output devices, and/or one or more network hosts. Moreover, in some embodiments, the network nodes and connections/communication channels between the nodes may change, due to expansion, modification or maintenance of the networks. The system (e.g., the processing/control system 106) is configured to identify the current configuration of the entity communication network 200's network architecture, i.e., the plurality of network nodes of the entity communication network and their communication channels and protocols.

In some embodiments, determining the network architecture of the entity communication network by the RPA control application by the processing/control system 106 further comprises identifying data communication links between the plurality of nodes and unique network addresses (e.g., hardware addresses such as media access control (MAC) addresses, network addresses such as internet protocol (IP) addresses) of the plurality of network nodes required/utilized for operative communication using the data communication links. Here, in some embodiments, the processing/control system 106 is structured to identify a physical layer, a data link layer, a network layer, a transport layer, a session layer, a presentation layer and/or an application layer of the network architecture.

The physical layer is typically associated with transfer of bits between two network nodes involving nodes such as repeaters, hubs, modems, fiber media converters and the like. The physical layer defines the electrical and physical specifications of the data connection and defines the relationship between a device and a physical transmission medium (for example, an electrical cable, an optical fiber cable, or a radio frequency link). This includes the layout of pins, voltages, line impedance, cable specifications, signal timing and similar characteristics for connected devices and frequency (5 GHz or 2.4 GHz etc.) for wireless devices. It is responsible for transmission and reception of unstructured raw data in a physical medium. As such, identifying the physical layer of the network architecture by the control system 106 typically involves determining the above listed components of the physical layer along with networking hardware transmission protocols for transmission of bit streams physical links of the data communication links between the plurality of nodes.

The data link layer typically involves interfacing with the physical layer by providing node-to-node transfer (e.g., a link between two directly connected nodes) and involves network nodes such as network switches, network interface cards (NICs), etc., based on physical addressing schemes (e.g., MAC addresses). The data link layer is also configured for detection and correction of errors in the physical layer and defines protocols for establishing and terminating a connection between two physically connected nodes/devices and protocols governing data flow control between them, such as Point-to-Point Protocol (PPP), Media access control (MAC) layer protocols for data transmission permissions/access and flow control and Logical link control (LLC) layer protocols for encapsulating network layer protocols and frame synchronization. Identifying the data link layer of the network architecture by the control system 106, typically involves determining the foregoing and the networking transmission protocols for frame synchronization, logical link control and media access control associated with the data communication links between the plurality of nodes. In this regard, the control system 106 typically identifies media access control (MAC) addresses of at least a portion of the plurality of nodes (e.g., for some or all of the network nodes that contain MAC addresses).

The network layer typically is associated with data packet delivery from end (e.g., source node) to end (intermediate or destination node) by utilizing a logical network addressing scheme such as Internet Protocol (IP) addresses, involving nodes such as routers. As such, the network layer provides the functional and procedural means of transferring variable length data sequences (called datagrams) from one node to another. The network layer is structured to deliver the message to the destination node, possibly routing it through intermediate nodes. If the message is too large to be transmitted from one node to another on the data link layer between those nodes, the network layer may implement message delivery by splitting the message into several fragments (multiple data packets) at one node, sending the fragments independently, and reassembling the fragments at another node. Identifying the network layer of the network architecture by the control system 106 typically involves identifying data packet forwarding and routing protocols associated with the data communication links between the plurality of nodes and identifying internet protocol (IP) addresses of at least a portion of the plurality of nodes.

Moreover, the transport layer provides the functional and procedural means of transferring variable-length data sequences from a source to a destination host via one or more networks, while maintaining the quality of service functions, using a transport-layer protocol such as a Transmission Control Protocol (TCP) or a User Datagram Protocol (UDP). Identifying the transport layer of the network architecture typically involves determining host-to-host communication protocols for technology applications associated with at least a portion of the plurality of nodes. The session layer is associated with establishing, managing and terminating the connections between the local and remote applications. The presentation layer establishes context between application-layer entities, in which the application-layer entities may use different syntax and semantics if the presentation service provides a mapping between them. The application layer interacts with the technology applications (software) that implement a communicating component, including identifying communication partners, determining resource availability, and synchronizing communication.

Referring now to FIG. 3, a schematic block diagram and process flow 300 is provided for converting a network node into a virtual workstation, in accordance with some embodiments of the invention. The operative transformation of the inherent functions of a network node (e.g., RPA system 105) for converting the network node (e.g., RPA system 105, user device 104 etc.) into a virtual workstation by the present invention (via the processing application 144 (also referred to as the RPA control application) of the processing/control system 106) is described with respect to FIG. 3. Specifically, FIG. 3 illustrates the operative functions of a user-machine interface, peripheral hardware and software/middleware components of each of the plurality of nodes, for example, the components of the RPA system 105, the processing system 106, the user device 350, or a data terminal equipment device (236*a-c*, 242, 246*a-d*, 256*a-6*, 266*a-c*, etc.). Typically, such DTEs or network hosts or computing devices comprise network node hardware components 310 and network node software/middleware components 350. The hardware components 310 typically comprise input devices/peripherals 308 (e.g., keypads/keyboards 308*a*, touch screens 308*b*, mouse/pointing devices 308*c*, gesture/speech recognition sensors/devices, microphones, joysticks, authentication credential capture devices listed above, image capture devices, and other peripheral input devices, similar to the devices 108 described previously) and output devices/peripherals (screens 310*a*-310*b*, speakers, printers and other peripheral output devices, similar to the devices 110 described previously), which are typically operatively controlled by a processing device 314 (not illustrated). The network node hardware components 310 may further comprise integrated circuit(s) 320 comprising a set of electronic circuits on a semiconductor material. In some embodiments, the integrated circuit 320 is a microprocessor 114 or processor 114, while in other embodiments, the integrated circuit 320 connects the input devices 308 and the output devices 310 with the processor 114 and/or the software components/memory of the network node. In some embodiments, the integrated circuit 320 comprises a graphics accelerator for presenting a graphical user interface on an output device 310. The software components 350 of the network node (e.g., the user device 104, the processing system 106, the RPA system 105, and/or the data terminal equipment device (236*a-c*, 242, 246*a-d*, 256*a-6*, 266*a-c*, etc.)) may comprise virtual memory 330 having kernel space and user space and device applications 350 or application software 350 (e.g., one or more technology applications) (which may be run using the kernel space and/or user space based on the configuration of the device application).

In some embodiments, during operation of a device application 350, such as the first technology application whose transmitted data is required to be tracked in real time, the user 102 may provide input to the device application 350 via the input device(s) 308, as indicated by arrow 302. This input may be relayed to the integrated circuit 320, and subsequently processed by the device driver(s) 332 and input subsystems of the input event interface 334 in conjunction with the device application 350, as illustrated.

In some embodiments of the present invention, the system (e.g., the RPA system 105) configures a robotic process automation (RPA) application 174 for interacting with a user interface of the device application 350 (e.g., for testing data transmission characteristics of the entity communication network and evaluating data flows associated in individual applications, in real-time or near real-time). Specifically, the control system 106 structures the first robotic process automation application 174 to utilize controls of one or more input devices 308 of the network node (e.g., the RPA system 105, and/or the data terminal equipment device (236*a-c*, 242, 246*a-d*, 256*a-6*, 266*a-c*, etc.)) to interact with the user interface of the device application 350 for converting the first network node into a virtual workstation for the first robotic process automation application. The control system 106 transmits and installs the RPA application at the memory device of the network node (e.g., the RPA system 105, and/or other suitable/compatible network nodes (236*a-c*, 242, 246*a-d*, 256*a-6*, 266*a-c*, etc.)). The RPA application 174 is structured to ascertain a particular input or input data portion to be provided to the user interface of the device application 350 for performing a particular task, e.g., a textual input comprising a first activity parameter, or a second activity parameter to be specified, and subsequently transmit corresponding data packets. In some embodiments, the RPA application 174 is structured to analyze the user interface to identify a pertinent graphical input element that is configured to receive the input data portion (e.g., a text box graphical input element for receiving the textual input comprising the first activity parameter, and/or a toggle element or drop down menu graphical input element for selecting the second activity parameter).

Next, the RPA application 174 is structured to identify an input device 308 of the plurality of input devices 308a-308c of the network node (e.g., the user device 104, the processing system 106, the RPA system 105, and/or the data terminal equipment device (236a-c, 242, 246a-d, 256a-6, 266a-c, etc.)) that is associated with the input data portion. In some instances the RPA application 174 is structured to identify the input device, based on, at least in part, the type of graphical input element associated with the input data portion. For example, for the textual input comprising the first activity parameter to be entered, the system may identify an input device of a keyboard/keypad (virtual or physical) 308a or a touch screen 308b, based on identifying predetermined input devices for a textual input type, based on determining that the input has to be entered anew and not selected from existing options in the interface, and/or based on the associated graphical input element of the text box. As another example, for the second activity parameter to be selected, the system may identify an input device of a mouse/pointing device 308c or a touch screen 308b, based on identifying predetermined input devices for a selection input type, based on identifying that the selection of the second activity parameter requires 2-D spatial selection/ actuation of a graphical element, and/or based on the associated graphical input element of the second activity parameter.

In response, the RPA application 174 is structured to identify an input signal format associated with the input device. For example, the keyboard/keypad (virtual or physical) 308a or the touch screen 308b for a textual input type, may typically transmit the received input from the user to the integrated circuit(s) 320 in a first input signal format, e.g., comprising key stroke signals or key codes or scancodes that make up the textual input in a particular format. As another example, the mouse/pointing device 308c or a touch screen 308b for a selection type input, may typically transmit the received input from the user to the integrated circuit(s) 320 in a second input signal format, e.g., electronic signals corresponding to the directional and spatial movement of the pointer/touch input in a particular format. Based on identifying the input signal format associated with the input device, the RPA application 174 is structured to transform the input data portion into the format of the associated input device. For example, the RPA application 174 is structured to transform the textual input comprising the first activity parameter first into key strokes and then into a group of associated scancodes, and the second activity parameter to be selected into the directional and spatial movement of the pointer/touch input in correlation with the layout of the user interface.

Next, the RPA application 174 is structured to assume the controls of the particular input device, and transmit the transformed input data portion in the format of the associated input device to the integrated circuit 320, as indicated by arrows 304 and 306. In some embodiments, the RPA application 174 is structured to utilize controls of the input devices by transmitting the transformed input data portion in the format of the associated input device directly to the integrated circuit 320, as indicated by the arrow 306. In some embodiments, the RPA application 174 is structured to utilize controls of the input devices by causing the input devices to transmit the transformed input data portion in the format of the associated input device to the integrated circuit 320, as indicated by arrow 304. As such, the RPA application 174 is structured to assume controls of input devices and automatically execute input functions of a user interface for performing one or more activities. The present invention allows for extremely quick and easy structuring of the RPA application 174 using the processing system application 144 (also referred to as the RPA control application) of the processing/control system 106 without requiring technical expertise, as will be described with respect to FIG. 4.

The integrated circuit(s) 320 may process the transformed input data and relay the data for processing at the device driver(s) 332 and input subsystems of the input event interface 334, where the transformed input data is interpreted (as an alphanumeric character or a selection/control function). This interpreted input data is correlated with the user interface and processed at the device application 350. In some embodiments, the device application 350 is configured to provide an output. This output may be processed by the device drivers 332 and converted into a format associated with the appropriate output device 310 and transmitted to the output device via the integrated circuit 320, as illustrated by FIG. 4.

Hence, the RPA application 174 is structured to operate existing user interfaces of existing device applications, even if the device is not being operated upon by the user for testing data transmission characteristics of the entity communication network and evaluating data flows associated in individual applications, in real-time or near real-time. In the absence of the present invention, automatic execution of input functions of an existing user interface of an existing technology application is typically not possible, for testing or other purposes. Even if it were possible, automatic execution of input functions of an existing user interface of an existing technology application would entail an extremely time and expense intensive conversion of the user interface of the technology application into a machine-to-machine form of data layer communication, and would require immense technical skill and knowledge of application programming.

As alluded to previously, the present invention is configured to automatically execute input functions of the user interface of the existing application using the controls of the user input devices for testing data transmission characteristics of the entity communication network and evaluating data flows associated in individual applications, in real-time or near real-time, even if the device is not being operated upon by the user. Specifically, the present invention allows for extremely quick and easy structuring of an infinitely customizable robotic process automation (RPA) application 174 for utilizing controls of the user input devices to perform a myriad of tasks. This RPA application 174 can be configured by an individual associated with an entity or the user, using an intuitive interface 144a of the processing system application 144 (also referred to as the RPA control application), without requiring technical expertise. Referring now to FIG. 4 illustrating a robotic process automation configuration interface 144a of the processing system application 144, in accordance with some embodiments of the invention. Specifically, FIG. 4 illustrates the robotic process automation application interface 144a provided to an individual associated with an entity or the user (e.g., using display devices of the control system 106 or the user devices 104) to facilitate configuration of a dedicated robotic process automation application to perform certain functions. The individual or the user may configure multiple robotic process automation applications, each performing dedicated functions/activities, which may then be transmitted to the RPA system 105 from the processing/control system 106.

The RPA application interface 144a is a graphical user interface comprising a robotic process automation configuration workspace window 420 configured to allow the user to customize/configure the activity or functions process flow 450 of the robotic process automation application. Typically, the system (and/or the individual/user) may identify process steps associated with the particular activity to be performed by the RPA application and the user interface to be operated upon. The interface 144a comprises an activity process step toolbox 410 comprising one or more graphical function elements of various function types (e.g., actuation, selection, textual input, graphical manipulation, control functions, and the like). The interface 144a further comprises process attribute customization/initialization tool(s) 430 for providing process attributes for each of the process steps of the constructed process flow 450.

As discussed, the control system 106 (and/or the individual/user) may identify one or more process steps for interacting with a user interface of an application desired to be acted upon (e.g., the first user interface of the first device application). The control system 106 may then present the robotic process automation (RPA) application interface 144a to the user/individual (e.g., using display device of the control system 106 or the user devices 104). As discussed, the robotic process automation application interface 144a comprises one or more graphical function elements (410) associated with the one or more process steps. The interface 144a is structured to allow the user to configure a process flow, at least in part (e.g., for testing data transmission characteristics of the entity communication network and evaluating data flows associated in individual applications, in real-time or near real-time) by physically moving (e.g., dragging and dropping), using an input device (e.g., a mouse/pointer device or a touch screen) the one or more graphical function elements from first 2-D location coordinates of the RPA application interface (e.g., from the activity process step toolbox 410) to second 2-D location coordinates of the RPA application interface (e.g., to the RPA configuration workspace 420). The user may arrange the graphical function elements, each indicating a process step, in a suitable arrangement to construct the process flow 450. The interface 144a may allow the user to provide, for each of the one or more graphical elements, process attributes (e.g., using the process attribute customization/initialization tool(s) 430). The control system 106 may then construct the first robotic process automation 174 based on the configured process flow and the process attributes received from the user, transmit the RPA application 174 to the RPA system (or to another desired network node) and/or commence the application 174.

FIG. 5 illustrates a high level process flow 500 for individual application flow isotope tagging within a network infrastructure, in accordance with some embodiments of the invention. In particular, the high level process flow 500 illustrates structuring a robotic process automation isotope tagging application for evaluating/testing data transmission characteristics of the entity communication network and evaluating data flows associated in individual applications, in real-time or near real-time, by converting the RPA system 105 into a dedicated virtual workstation. These steps are typically performed by processor 138 (also referred to as the first processor) of the control system 106 based on executing computer readable/executable instructions/code of the processing system/control application 144 (also referred to as the RPA control application).

As illustrated by block 502, the system may establish operative communication links with the plurality of network nodes of the entity communication network 200 to ascertain current or most recent the network architecture/configuration. As such, the control system 106 is structured to identify the plurality of network nodes of the entity communication network. The determination of the plurality of network nodes and the network architecture of the entity communication network and the various component/protocols of the network architecture (e.g., a physical layer, a data link layer, a network layer, a transport layer, etc.) is described in detail with respect to FIG. 2. As discussed previously, the plurality of network nodes typically comprise one or more modems, one or more hubs, one or more switches, one or more routers, one or more load balancers, and one or more data terminal equipment devices. Moreover, the one or more data terminal equipment devices of the entity communication network may comprise one or more of server devices, proxy servers, one or more computing devices, one or more data output devices, and/or one or more network hosts having corresponding unique network addresses.

Next, the system configures a robotic process automation (RPA) isotope tagging application (e.g., RPA application 174) for tagging, tracking and evaluating data flow associated with a particular technology application based on the determined network architecture, as illustrated by block 504. In this regard, the control system 106 via the control application 144 typically identifies a plurality of source technology applications run by the source network node, and configures the RPA isotope tagging application 174 in accordance with the protocols of said technology applications. Moreover, the control system 106 identifies one or more technology activities performed by each of the identified technology applications (e.g., the first technology application) that are associated with transmission of data packets between at least a portion of the plurality of network nodes of the entity communication network. For example, the system may determine which of the activities involve transmitting or receiving data from the network and disregard internal devices activities that do not require transmitting or receiving data external to the source network node/device, via the network. Next, the system structures the RPA isotope tagging application for inserting unique isotope tag strings into each of the data packets transmitted by the technology applications (e.g., first technology application) for performing the first technology activity (e.g., Website front end activities, entity logic middleware activities, server-less activities, Queueing activities, Caching activities, Database activities, DNS, Proxy, Firewall and other activities) of the one or more technology activities, in accordance with the configuration of said technology application.

As described with respect to FIGS. 3 and 4 previously, in some embodiments, the control system 106 configures the RPA isotope tagging application for tagging and tracking data flow associated with the first technology application by structuring the RPA isotope tagging application to utilize controls of an input device of the RPA device to interact with a first interface of the first technology application for converting the RPA device into a virtual workstation for the RPA isotope tagging application.

Subsequently, the control system 106 may then transmit the RPA isotope tagging application 174 to the RPA system 105, via a first operative communication link between the devices, as illustrated by block 506. In some instances, the control system 106 causes the RPA system 105 to store and install the RPA isotope tagging application 174. In some embodiments, the control system 106 transmits a first control signal, via the first operative communication link, to the RPA isotope tagging application 174, at block 508. This first control signal is structured to cause the first robotic process automation application to initiate the tagging and tracking of the data flow associated with the technology application, as will be described below with respect to FIG. 6. The control system 106 may send the first control signal to the RPA system 105 either proactively or in response to a user command.

FIG. 6 illustrates a high level process flow 600 for individual application flow isotope tagging within a network infrastructure, in accordance with some embodiments of the invention. In particular, the high level process flow 600 illustrates process steps performed by the robotic process automation isotope tagging application 174 stored on memory device 170 and run on the RPA system 105 for evaluating/testing data transmission characteristics of the entity communication network and evaluating data flows associated in individual applications, in real-time or near real-time, by converting the RPA system 105 into a dedicated virtual workstation. These steps are typically performed by processor 168 (also referred to as the second processor) of the RPA system 105 based on executing computer readable/executable instructions/code of the RPA application 174a constructed by the control system 106 (as described by process flow 500 of FIG. 5).

As illustrated by block 602, in response to the first control signal, the RPA isotope tagging application 174 is structured to monitor the first technology activity application. The first technology application is typically run on a source network node (e.g., source network node 242 illustrated in FIGS. 8A and 8C). The source network node may be distinct from the control system 106 and the RPA system 105, or alternatively, the source network node may be one of the control system 106 or the RPA system 105. In some embodiments, the RPA isotope tagging application 174 monitors the functions/activities performed by the RPA isotope tagging application 174, and identifies any corresponding data packets being sent out (and/or being received) from the source network node. Alternatively, in other embodiments, the RPA isotope tagging application 174 initiates testing of the first technology application by causing activation of the first technology application and causing the first technology application to perform the first technology activity, as will be described in detail below. As such, the RPA isotope tagging application 174 is configured to identify a first data packet associated with a first activity of the technology application (e.g., technology application 1 indicated on FIGS. 8A and 8C), that is transmitted from the source network node to a destination network node (e.g., network node 236a illustrated by FIG. 8) of the plurality of network nodes. Typically, the data packets are transmitted from the source network node to the destination network node via one or more intermediate network nodes (e.g., network nodes 240, 215 and 230 illustrated by FIGS. 8A and 8C), with the foregoing nodes forming a network transmission path (e.g., network transmission path "X" illustrated by FIGS. 8A and 8C).

In the embodiments where the RPA isotope tagging application 174 initiates testing of the first technology application, in some instances, the system 105 may receive, from an input device (of the RPA system 106 or another networked device/system), a user request to test the first technology activity of the first technology application. The RPA system 105 may then transmit an activation control instruction to the source network node. This activation control instruction is structured for activating the first technology application at the source network node. The RPA system may then transmit an activity control instruction structured for causing the first technology application to perform the first technology activity. Here, the RPA system 105 may transmit the first technology activity input to the source node using controls of an input device of the source network node, as described previously with respect to FIG. 3. Subsequently, the RPA system identifies the first data packet of a first sequence of data packets associated with the first technology activity that is configured to be transmitted from the source network node.

In this regard, as discussed with respect to FIG. 3, the RPA system typically identifies a first input data portion to be provided at first interface of the first technology application for causing the application to perform the first technology activity at the source network node. This input data portions may refer to one or more of clicking/selection of particular graphical elements of the first interface of the technology application, providing textual input, etc. The RPA system then identifies an input device of a plurality of input devices of the source network node that is associated with the first input data portion, (e.g., a mouse/pointer device, a keyboard, etc.) and identifies an input signal format associated with the input device. The RPA system then transforms the first input data portion into the input signal format associated with the input device, and transmits, to the first technology application, input device control signals for the first input data in the input signal format, in a similar manner as described with respect to FIG. 3, thereby causing the first technology application to perform the first technology activity and subsequent transmission of corresponding data packets.

Typically, data transmitted by the technology application is segmented into a plurality of fixed size or varying size data packets for transmission as a sequence, which are then assembled at the destination node upon receipt. The destination node may not necessarily receive the data packets in the order they were sent. Hence, the data packets in this sequence contain sequence packet numbers or identification tags that help the destination network node to reconstruct the transmitted data by assembling the data packets correct order. As such, the RPA system typically identifies the sequence of data packets associated with the first technology activity that transmitted from the source network node and identifies the order/presence/total number of the individual packets based on the packet sequence number in the header element of the data packets.

Prior to transmission of the data packets associated with the particular technology activity from the source network node, the RPA system inserts unique isotope tag strings in the data packets, as indicated by block 604. As will be described in detail with respect to FIGS. 7A and 7B, the RPA system inserts at least a portion of the unique isotope tag string in at least one of the header element, the payload element, and the trailer element of each of the data packets. Typically, the unique isotope tag string comprises multiple portions/elements. A first isotope portion may correspond to the technology application associated with the data packet, e.g., comprising a unique identifier of the associated technology application (for example: "TTBO.EXE"). In some embodiments, the first isotope portion comprises a predetermined formatting, a predetermined number of bytes and a predetermined number of characters. This unique identifier of the associated technology application typically remains the same for all technology activities performed by the technology application. A second isotope portion may correspond to the particular technology activity being performed that caused the origination of the data packet, e.g., comprising a unique identifier of the associated technology activity (for example: "PE412A#"). Similarly, in some embodiments, the second isotope portion comprises a predetermined formatting, a predetermined number of bytes and a predetermined number of characters. This unique identifier of the associated technology activity typically remains the same for all data packets/strings/sequences sent for that technology activity. A third isotope portion may correspond to the sequence of the data packet within the data packet string, e.g., packet sequence number retrieved from the header of the data packet (for example: "A1"). In some embodiments, the first isotope portion comprises a predetermined formatting, a predetermined number of bytes and a predetermined number of characters. The packet sequence number is typically distinct among fragmented data packets belonging to a particular packet sequence/string for a particular activity, by may be similar to packet sequence numbers associated with data packet strings of other activities/technology applications. The RPA system may assemble these isotope portions, in a suitable order, to construct the unique isotope tag string for each data packet (e.g., "TTBO-.EXE//PE412A#//A1" or TTBO.EXEPE412A#A1"). For example, the RPA system may construct a first unique isotope tag string for a first data packet (e.g., first data packet 810A illustrated in FIGS. 8A and 8C) of the first technology activity having (i) a first isotope portion comprising a unique identifier of the first technology application, (ii) a second isotope portion comprising a unique identifier of the first technology activity; and/or (iii) a third isotope portion comprising the packet sequence number of the first data packet, resulting in a first unique isotope tag string of "TTBO.EXE//PE412A#//A1". As another example, the RPA system may construct a second unique isotope tag string for a second data packet (e.g., first data packet 810B illustrated in FIGS. 8A and 8C) of the first technology activity having (i) a first isotope portion comprising the unique identifier of the first technology application (e.g., "TTBO.EXE"); (ii) a second isotope portion comprising the unique identifier of the first technology activity (e.g., PE412A#); and (iii) a third isotope portion comprising the packet sequence number of the second data packet (e.g., "A5"), resulting in the second unique isotope tag string of "TTBO.EXE//PE412A#//A5". In some embodiments, the unique isotope tag string may comprise at least a portion of an IP address and/or a MAC address of the corresponding network node.

Similarly, the RPA application 174 may construct the unique isotope tag strings for data packets associated with other activities (also referred to as a second technology activity or an auxiliary technology activity) and for data packets associated with other technology applications. For example, the RPA system may construct a third/auxiliary unique isotope tag string for a third data packet (e.g., third data packet 810C illustrated in FIGS. 8A and 8C) of another auxiliary activity performed by the first technology application having: (i) a first isotope portion comprising the unique identifier of the first technology application (e.g., "TTBO.EXE"), (ii) a second isotope portion comprising an auxiliary unique identifier of the auxiliary technology activity (e.g., "56DRT20"); and/or (iii) a third isotope portion comprising the packet sequence number of the auxiliary data packet (e.g., "J7"), resulting in a isotope tag of "TTBO-.EXE//56DRT20//J7". In a similar manner, the RPA system may construct an unique isotope tag string for a data packet (e.g., data packet 740C illustrated in FIG. 8) association with a different second technology application (e.g., technology application 4 indicated in FIG. 8) to be "App34//44rc//J7".

As discussed, the RPA isotope tagging application is structured to insert a first unique isotope tag string in at least one of a header portion, a payload portion, and a trailer portion of the first data packet prior to transmission from the source network node of the plurality of network nodes, as indicated by block 604. In some embodiments, as indicated by block 606, the RPA isotope tagging application initiates transmission of the first data packet from the source network node of the plurality of network nodes to the destination network node of the plurality of network nodes.

The RPA isotope tagging application is configured to track, in real time, application flow of the technology application within network data flow of a plurality of applications of the entity communication network, as illustrated by block 608. In some embodiments, the RPA application is configured to track, in real time, current states of data flows associated with individual activities of each technology application, for example, based on the Transport Layer Security (TLS) session handshakes (i.e., authentication and key exchange protocols for providing privacy and data integrity between two communicating nodes or applications), Secure Sockets Layer (SSL) communication security protocols for establishing, resuming and/or conducting sessions between two communicating nodes or applications, and the like. Moreover, in some embodiments, the RPA application is structured to employ a routing table or routing information base (RIB) to map packet queues, transmission and delivery. Tracking the data flows comprises determining current locations of the data packets based on the respective unique isotope tag strings, as will be described in detail with respect to FIGS. 8A-8C.

In some embodiments, for each data packet, based on the source and destination network nodes, the network architecture and the transmission protocols, the system identifies one or more intermediate network nodes that are likely to be utilized in transmitting the first data packet from the source network node to the destination network node (e.g., based on identifying likely network transmission paths). The RPA system may then monitor incoming data packets at each of the identified nodes in the likely transmission paths (also referred to as path network nodes). The path network nodes of the plurality of network nodes comprise the one or more likely intermediate network nodes, the destination network node and the source network node. The RPA system may then parse each of the one or more incoming data packets at each of the nodes to identify the unique isotope tag strings inserted in the data packet. Subsequently, the system is able to pinpoint the precise location of a particular data packet (e.g., a first data packet) based on identifying that the unique isotope tag string of a first incoming data packet of the one or more incoming data packets at the first network node of path network nodes matches the first unique isotope tag string. The system may ascertain, in real time, that the current location of the first data packet is the first node, i.e., the node at which it is identified at the current time.

Here, the RPA system typically matches the corresponding portions of the isotope tag with unique identifiers of the technology application and/or technology activity desired to be tracked to identify the data flow characteristics. For instance, the system may identifying that (i) a first isotope portion of the unique isotope tag string of the first incoming data packet matches a unique identifier of the identifier of the first technology application, and (ii) a second isotope portion of the unique isotope tag string of the first incoming data packet matches a unique identifier of the first technology activity, to conclude that the first incoming data packet is associated with the first technology activity performed by the first technology application. Next, at block 610, the RPA isotope tagging application then presents, on a display device, the current location of the first data packet in an application tracking user interface, as will be described in detail with respect to FIGS. 8A-8C.

FIGS. 7A and 7B, illustrate schematic representations 700A and 700B of a data packet 710, respectively, in accordance with some embodiments of the invention. In particular, FIGS. 7A and 7B illustrate a schematic representation of a data packet (710, 710') (also referred to as a network packet) that is generated by the technology application of the source network node. The data packet (710, 710') typically comprises a header portion/element (720, 720'), a payload portion/element (730, 730') and a trailer/footer portion/element (740, 704'). The header portion (720, 720') typically comprises instructions about the data carried by the packet, including length of packet (e.g., in the case of variable length data packets), packet sequence number (728, 728'), protocol associated with the data packet/network (726, 726') (e.g., defining what type of packet is being transmitted: e-mail, web page, streaming video), destination address (724, 724') (e.g., IP address and/or MAC address of the destination network node) and/or an originating address (722, 722') (e.g., IP address and/or MAC address of the source network node). The payload portion (730, 730') typically is the body of the data packet containing the data that is desired to be delivered to the destination network node. The trailer/footer portion (740, 704') comprises packet end data (732, 732') indicating the end of the packet and/or error checks such as a Cyclic Redundancy Check (CRC) (734, 734').

As discussed with respect to block 604 of FIG. 6, the RPA system inserts at least a portion of the unique isotope tag string in at least one of the header portion/element (720, 720'), a payload portion/element (730, 730') and a trailer/footer portion/element (740, 704'), of each of the data packets. In some embodiments, as illustrated by FIG. 7A, the system may insert the unique isotope tag string 550 in the header portion/element 720 of the data packet 710. In some embodiments, as illustrated by FIG. 7B, the system may insert a first unique isotope tag string element 560A (e.g., the first isotope portion comprising a unique identifier of the associated technology application) in the header portion/element 720' and a second unique isotope tag string element 560B (e.g., the second isotope portion comprising a unique identifier of the associated technology activity) in the trailer portion/element 740'.

FIGS. 8A-8C illustrate schematic representations 800A-800C of a real-time application tracking user interface 174a of the RPA isotope tagging application 174, respectively, in accordance with some embodiments of the invention. As discussed with respect to block 608 of FIG. 6, the RPA isotope tagging application is configured to track, in real time, application flow of the technology application within network data flow of a plurality of applications of the entity communication network. Tracking the data flows comprises identifying in real-time, a current state of the data flows associated with a particular activity of a particular technology application within the entity communication network 200, e.g., by determining current locations of the data packets based on the respective unique isotope tag strings.

Now referring to FIGS. 8A and 8C, in some embodiments, for each data packet associated with the specific activity of the particular technology application, based on the source network node (e.g., network node 242) and destination network nodes (e.g., network node 236a), the network architecture and the transmission protocols, the system identifies one or more intermediate network nodes (e.g., network nodes 240, 215, and 230) that are likely to be utilized in transmitting the first data packet (e.g., data packet 810A) from the source network node to the destination network node (e.g., based on identifying likely network transmission paths such as path "X"). The RPA system may then monitor incoming data packets at each of the identified nodes in the likely transmission paths (e.g., network nodes 240, 215, 230 and 236a), e.g., based on the Transport Layer Security (TLS) session handshakes (i.e., authentication and key exchange protocols for providing privacy and data integrity between two communicating nodes or applications), Secure Sockets Layer (SSL) communication security protocols for establishing, resuming and/or conducting sessions between two communicating nodes or applications, and the like. The RPA system may then parse each of the one or more incoming data packets (e.g., data packets 810C at node 240; data packets 810A, 810B and 840C at node 215 and data packet 840B at node 236a) at each of the nodes to identify the unique isotope tag strings inserted in the data packet. Subsequently, the system is able to pinpoint the precise location of a particular data packet (e.g., a first data packet 810A) at a given instance of time, based on identifying that the unique isotope tag string of a first incoming data packet of the one or more incoming data packets at the first network node of path network nodes matches the first unique isotope tag string. The system may ascertain, in real time that the current location of the first data packet is the first node, i.e., the node at which it is identified at the current time based on precisely identifying that the first data packet is currently at as incoming or outgoing queue of the first node.

Here, the RPA system typically presents an application tracking user interface 174a (GUI) of the RPA application on a suitable display device (e.g., a display device of the RPA system 105 or a display device of another networked device), as illustrated by FIGS. 8A and 8C. The system may construct a graphical representation 800A and 800C of at least a portion of the network architecture of the entity communication network 200 (illustrated in FIG. 2) comprising at least the source network node, the destination network node and the one or more intermediate network nodes, and present this interface 174a on the display device. The graphical representation 800A-800C comprise suitable graphical representations of the network nodes and the operative communication links. The interface 174a is constructed such that the user may select one or more network nodes to activate pop-up data elements (852, 854) containing actionable elements associated with technology applications and/or technology activities present on, or that are currently active on the network node. For example, data element 852 comprises action elements for technology applications 1, 4 and 12 that are stored on the network node 242. As another example, data element 854 comprises action elements for technology applications 3 and 4 that are currently active on the network node 256c. The user may then select one or more of these action elements to cause the interface 174a to present data flows associated with the particular technology application or technology activity.

For instance, as illustrated by FIGS. 8A and 8C, the user may select the action element associated with a first technology activity of the technology application 1 (in the data element 852) of the network node 242. The system may then overlay a graphical path element associated with the network transmission path "X" on the graphical representation 800A and 800C indicating the path of flow of the data packets from the source node (i.e., network node 242) to the destination node (i.e., network node 236a) via intermediate nodes (i.e., network nodes 240, 215 and 236a). Next the RPA system may overlay data packet elements (e.g., elements 810A, 810B, and 810C) indicating the current locations of data packets, whose positions are changed, in real-time, based on their precise locations at a particular instance in time. For instance, the system may overlay element 810A associated with the first data packet of the first technology activity of the technology application 1 proximate a representation of the network node 215, indicating the data packet is incoming (e.g., present in an incoming queue) or has been received (e.g., is being processed) at the network node 215. Similarly, system may overlay elements 810B and 810C (e.g., data packets/fragments belonging to a sequence/string of data packets) that are also associated with the first technology activity of the technology application 1, proximate appropriate network nodes, indicating their current location.

As discussed, the application tracking interface 174a is dynamic and is configured for real time modification to indicate changes in data flows to reflect the current state of the data flows of individual activities of individual applications. In some embodiments, the system may identify that the current location of the first data packet 810A has changed from the first network node (e.g., network node 215) to subsequent second network node (e.g., network node 230) associated with the network transmission path "X". The RPA system 105 may then modify the spatial position of the data packet element 810A associated with the first data packet such that the data packet element is proximate a representation of a second network node 230, as indicated by 810A', in real-time.

As another example, as illustrated by FIGS. 8A and 8C, the user may select the action element associated with another technology activity of the technology application 4 (in the data element 852) of the network node 242. The system may then overlay a graphical path element associated with the network transmission path "Z" on the graphical representations 800A and 800C indicating the path of flow of the data packets from the source node (i.e., network node 242) to the destination node (e.g., network node 236b) via intermediate nodes (i.e., network nodes 240, 215, and 230). Next the RPA system may overlay data packet elements indicating the current locations of data packets (e.g., 840B and 840C).

As such, the real-time application tracking user interface 174a comprises a map of data flows indicating the overall volumes of data flows across the entity communication network 200, illustrated by FIG. 8A and illustrated in more particularly by Detail 800B of FIG. 8B. Specifically, as illustrated by FIG. 8B, the interface 174a is structured to illustrate a network view indicating the real-time state of data flows A across each network node (e.g., network node 215). However, although this real-time network view provides the current volumes of data flows across the network nodes, it does not, however ascertain the specific activities/processes of specific applications that are causing these data flows A. Hence, based on the isotope tagging and tracking described herein, the RPA application is structured to overlay a real-time dynamic application process view (e.g., paths X, Y, and Z having corresponding dynamic data flow/packet indicators 810A, 810B, 840C, and 830A), over the network view, indicating the data flows of the specific activities/processes being run by individual applications across the entity communication network 200, at a particular instance of time.

The correlation and overlay of the data flows of the individual activities/processes of individual applications over the overall network flow, allows the RPA system to ascertain which specific activities of technology applications are driving the performance characteristics of the network/network nodes such as, throughput, latency, size of queues, bit-rate, bandwidth consumption, and the like. For example, as illustrated in FIG. 8A, the system may identify current data flows associated with a second technology activity of the technology application 3 (indicated by the data element 854) of the network node 256c. The system may identify (and over lay on the interface 174a) the network transmission path "Y" of the path of flow of the data packets from the source node (i.e., network node 256c) to the destination node (i.e., an external destination, with the data packet leaving the entity communication network 200 at node 290 (e.g., a router/firewall/modem) or to another part of the network 290) via intermediate nodes (i.e., network nodes 250 and 215). As discussed, the RPA system may overlay data packet elements indicating the current locations of data packets. For instance, the system may overlay elements 830A and 830B, indicating their current locations. Based on the correlation/overlay of the overall network data flow and the specific data flows of the particular activity of the technology application 3 (indicated by FIG. 8B), the system may identify that the data flows Y associated with a stimulus activity, i.e., the second technology activity of the technology application 3 cause at least one of the performance characteristics (e.g., throughput, latency, size of queues, bit-rate, bandwidth consumption) of the network node 215 (or another network node or communication link) to exceed or fall below (or otherwise deviate from) a predetermined optimal threshold range (e.g., having upper limits and lower limits) of the performance characteristic.

In response, as illustrated by FIG. 8C, the RPA system may dynamically and in real-time, undertake mitigation measures. Here, in some embodiments, the RPA system may perform horizontal scaling measures, involving automatically employing or adding additional network nodes or processes of the entity communication network 200 (typically, suitable nodes that do not adversely affect certain performance characteristics like SLA) to process the data flows for a certain time period, e.g., until the identified deviated performance characteristics of the network/network nodes identified above, are restored to optimum levels. In other embodiments, the RPA system may perform network scaling measures (e.g., geographic scaling measures), involving automatically moving the processing of the identified stimulus activity to another part of the network, for a predetermined time period. For example, as illustrated by FIG. 8C, the system may re-route forthcoming data packet flows (e.g., 830B') to another available/suitable network node 212, as indicated by path Y'. Moreover, the mitigation measures may also involve security scrubbing, i.e., removal of malicious data flows, and/or impeding/discontinuing applications/activities that cause the malicious data flows.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for individual application flow isotope tagging within a network infrastructure, wherein the system is configured to construct a robotic process automation application structured to determine data flow associated with a first technology application within the network infrastructure, comprising:
   an entity communication network comprising a plurality of network nodes;
   a control system in operative communication with the entity communication network comprising:

a first processor;

a first memory device; and a robotic process automation (RPA) control application that is stored in the first memory device comprising computer readable instructions executable by the first processor;

a robotic process automation (RPA) device in operative communication with the control system and the entity communication network, the RPA device comprising:

a second processor;

a second memory device; and a robotic process automation (RPA) isotope tagging application that is stored in the second memory device comprising computer readable instructions executable by the second processor;

wherein the RPA control application is configured to:

identify the plurality of network nodes of the entity communication network, wherein identifying the plurality of network nodes comprises determining a network architecture of the entity communication network;

configure the robotic process automation (RPA) isotope tagging application for tagging and tracking data flow associated with a first technology application of a plurality of applications of the entity communication network, based on the network architecture;

transmit, via a first operative communication link, the RPA isotope tagging application to the RPA device; and transmit a first control signal, via the first operative communication link, to the RPA isotope tagging application, the first control signal being structured to cause the RPA isotope tagging application to initiate the tagging and tracking of the data flow associated with the first technology application;

wherein the RPA isotope tagging application is configured to:

in response to the first control signal, identify a first data packet associated with a first technology activity of the first technology application, wherein the first data packet is structured to be transmitted from a source network node to a destination network node of the plurality of network nodes, via one or more intermediate network nodes of the plurality of network nodes;

insert a first unique isotope tag string in at least one of a header element, a payload element, and a trailer element of the first data packet prior to transmission from the source network node of the plurality of network nodes;

initiate transmission of the first data packet from the source network node of the plurality of network nodes to the destination network node of the plurality of network nodes;

track, in real time, the data flow of the first technology application within network data flow of the plurality of applications of the entity communication network, wherein tracking comprises determining a current location of the first data packet based on the first unique isotope tag string; and present, on a display device, the current location of the first data packet in an application tracking user interface.

2. The system of claim 1, wherein the RPA isotope tagging application is further configured to:

identify a first network transmission path that is associated with transmitting the first data packet from the source network node to the destination network node via a first intermediate network node of the one or more intermediate network nodes;

determine a current network performance characteristic associated with the first intermediate network node; and based on determining (i) that the current network performance characteristic associated with the first intermediate network node is outside of a predetermined threshold range; (ii) that the data flow associated with the first technology activity of the first technology application comprising the first data packet causes, at least in part, the current network performance characteristic to occur at outside of the predetermined threshold range, re-route one or more second data packets associated with the first technology activity of the first technology application through a second intermediate network node of the plurality of network nodes that is not associated with the first network transmission path;

wherein the second intermediate network node is associated with transmitting the one or more second data packets from the source network node to the destination network node via a second network transmission path.

3. The system of claim 1, wherein configuring the RPA isotope tagging application for tagging and tracking the data flow associated with the first technology application comprises structuring the RPA isotope tagging application to utilize controls of an input device of the RPA device to interact with a first interface of the first technology application for converting the RPA device into a virtual workstation for the RPA isotope tagging application.

4. The system of claim 1, wherein the plurality of network nodes comprise one or more modems, one or more hubs, one or more switches, one or more routers, one or more load balancers, and one or more data terminal equipment devices.

5. The system of claim 4, wherein the one or more data terminal equipment devices of the entity communication network comprise one or more of server devices, proxy servers, one or more computing devices, one or more data output devices, and/or one or more network hosts having corresponding unique network addresses.

6. The system of claim 1, wherein configuring the RPA isotope tagging application, by the RPA control application, further comprises:

identifying the first technology application of a plurality of source technology applications run by the source network node;

identifying one or more technology activities performed by the first technology application that are associated with transmission of data packets between at least a portion of the plurality of network nodes of the entity communication network; and structuring the RPA isotope tagging application for inserting unique isotope tag strings into each of the data packets transmitted by the first technology application for performing the first technology activity of the one or more technology activities.

7. The system of claim 1, wherein identifying, by the RPA isotope tagging application, the first data packet associated with the first technology activity of the first technology application, further comprises:

identifying that the first technology activity is initiated by the first technology application at the source network node;

identifying a first sequence of data packets associated with the first technology activity that are configured to be transmitted from the source network node;

identify the first data packet of the first sequence of data packets based on analyzing a packet sequence number in the header element of the first data packet;

insert the first unique isotope tag string in at least one of the header element, the payload element, and the trailer element of the first data packet prior to transmission from the source network node, wherein the first unique isotope tag string comprises:

a first isotope portion comprising a unique application identifier of the first technology application;

a second isotope portion comprising a unique activity identifier of the first technology activity; and a third isotope portion comprising the packet sequence number of the first data packet.

8. The system of claim 7, wherein the RPA isotope tagging application is further configured to:

identify that an auxiliary technology activity is initiated by the first technology application at the source network node;

identifying an auxiliary sequence of data packets associated with the auxiliary technology activity that are structured to be transmitted from the source network node;

identify a third data packet of the auxiliary sequence of data packets based on analyzing a packet sequence number in the header element of the third data packet;

insert a third unique isotope tag string in at least one of a header element, a payload element, and a trailer element of the third data packet prior to transmission from the source network node, wherein the third unique isotope tag string comprises:

a first isotope portion comprising the unique application identifier of the first technology application;

a second isotope portion comprising an auxiliary unique activity identifier of the auxiliary technology activity; and a third isotope portion comprising the packet sequence number of the auxiliary data packet.

9. The system of claim 1, wherein identifying, by the RPA isotope tagging application, the first data packet associated with the first technology activity of the first technology application, further comprises:

receiving, from an input device, a user request to test the first technology activity of the first technology application;

transmitting an activation control instruction structured for activating the first technology application at the source network node;

transmitting an activity control instruction structured for causing the first technology application to perform the first technology activity, wherein transmitting the activity control instruction comprises transmitting, to the first technology application first technology activity input using controls of a source input device of the source network node;

identifying the first data packet of a first sequence of data packets associated with the first technology activity that is configured to be transmitted from the source network node; and insert the first unique isotope tag string in at least one of the header element, the payload element, and the trailer element of the first data packet prior to transmission from the source network node.

10. The system of claim 9, wherein transmitting, by the RPA isotope tagging application, the activity control instruction structured for causing the first technology application to perform the first technology activity further comprises:

identify a first input data portion to be provided at first interface of the first technology application for performing the first technology activity at the source network node;

identify the source input device of a plurality of source input devices of the source network node that is associated with the first input data portion;

identify an input signal format associated with the source input device;

transform the first input data portion into the input signal format associated with the source input device; and transmit, to the first technology application, input device control signals for the first input data portion in the input signal format for causing the first technology application to perform the first technology activity.

11. The system of claim 1, wherein tracking, by the RPA isotope tagging application, the data flow of the first technology application within the network data flow of the plurality of applications of the entity communication network, further comprises:

identifying the one or more intermediate network nodes that are associated with transmitting the first data packet from the source network node to the destination network node based on identifying a network transmission path;

identifying, at each of path network nodes of the plurality of network nodes one or more incoming data packets, wherein the path network nodes of the plurality of network nodes comprise the one or more intermediate network nodes, the destination network node and the source network node;

parsing, at a first network node of the path network nodes, each of the one or more incoming data packets to identify a unique isotope tag string of the data packet;

based on identifying that the unique isotope tag string of a first incoming data packet of the one or more incoming data packets at the first network node of the path network nodes matches the first unique isotope tag string, determining that the current location of the first data packet is the first network node of the path network nodes.

12. The system of claim 11, wherein identifying, by the RPA isotope tagging application, that the unique isotope tag string of the first incoming data packet of the one or more incoming data packets at the first network node of the path network nodes matches the first unique isotope tag string, further comprises:

identifying that (i) a first isotope portion of the unique isotope tag string of the first incoming data packet matches a unique identifier of the first technology application, and (ii) a second isotope portion of the unique isotope tag string of the first incoming data packet matches a unique identifier of the first technology activity.

13. The system of claim 1, wherein presenting, by the RPA isotope tagging application, the current location of the first data packet in the application tracking user interface, further comprises:

identifying the one or more intermediate network nodes that are associated with transmitting the first data packet from the source network node to the destination network node based on identifying a network transmission path;

constructing a graphical representation of at least a portion of the network architecture of the entity communication network comprising at least the source network node, the destination network node and the one or more intermediate network nodes;

presenting the graphical representation of at least the portion of the network architecture on a display device, wherein presenting comprises overlaying a graphical path element associated with the network transmission path on the graphical representation of at least the portion of the network architecture; and overlaying a data packet element associated with the first data packet, proximate a representation of a first network node associated with the current location of the first data packet on the graphical representation of at least the portion of the network architecture.

14. The system of claim 13, wherein the RPA isotope tagging application is further configured to:

identify that the current location of the first data packet has changed from the first network node to subsequent second network node associated with the network transmission path; and modify, in real time, a spatial position of the data packet element associated with the first data packet such that the data packet element is proximate to a representation of a second network node on the graphical representation of at least the portion of the network architecture.

15. The system of claim 1, wherein determining the network architecture of the entity communication network by the RPA control application further comprises identifying data communication links between the plurality of nodes and unique network addresses of the plurality of network nodes for operative communication using the data communication links.

16. The system of claim 15, wherein determining the network architecture of the entity communication network by the RPA control application, further comprises:

identifying a physical layer of the network architecture of the entity communication network, comprising identifying networking hardware transmission protocols for transmission of bit streams physical links of the data communication links between the plurality of nodes;

identifying a data link layer of the network architecture of the entity communication network, comprising identifying networking transmission protocols for frame synchronization, logical link control and media access control associated with the data communication links between the plurality of nodes, wherein identifying the data link layer comprises identifying media access control (MAC) addresses of at least a portion of the plurality of nodes;

identifying a network layer of the network architecture of the entity communication network, comprising identifying data packet forwarding and routing protocols associated with the data communication links between the plurality of nodes, wherein identifying the network layer comprises identifying internet protocol (IP) addresses of at least the portion of the plurality of nodes; and identifying a transport layer of the network architecture of the entity communication network, comprising identifying host-to-host communication protocols for the plurality of technology applications associated with at least the portion of the plurality of nodes.

17. A computer program product for individual application flow isotope tagging within a network infrastructure, wherein the computer program product is configured to construct a robotic process automation application structured to determine data flow associated with a first technology application within the network infrastructure, comprising one or more non-transitory computer-readable storage media having computer-executable instructions that when executed by one or more processing devices are configured to cause the one or more processing devices to:

identify a plurality of network nodes of an entity communication network, wherein identifying the plurality of network nodes comprises determining a network architecture of the entity communication network;

configure a robotic process automation (RPA) isotope tagging application for tagging and tracking data flow associated with a first technology application of a plurality of applications of the entity communication network, based on the network architecture;

transmit, via a first operative communication link, the RPA isotope tagging application to a RPA device; and transmit a first control signal, via the first operative communication link, to the RPA isotope tagging application, the first control signal being structured to cause the RPA isotope tagging application to initiate the tagging and tracking of the data flow associated with the first technology application;

in response to the first control signal, identify a first data packet associated with a first technology activity of the first technology application, wherein the first data packet is structured to be transmitted from a source network node to a destination network node of the plurality of network nodes, via one or more intermediate network nodes of the plurality of network nodes;

insert a first unique isotope tag string in at least one of a header element, a payload element, and a trailer element of the first data packet prior to transmission from the source network node of the plurality of network nodes;

initiate transmission of the first data packet from the source network node of the plurality of network nodes to the destination network node of the plurality of network nodes;

track, in real time, the data flow of the first technology application within network data flow of the plurality of applications of the entity communication network, wherein tracking comprises determining a current location of the first data packet based on the first unique isotope tag string; and present, on a display device, the current location of the first data packet in an application tracking user interface.

18. The computer program product of claim 17, wherein executing the computer-executable instructions is further configured to cause the one or more processing devices to:

identify a first network transmission path that is associated with transmitting the first data packet from the source network node to the destination network node via a first intermediate network node of the one or more intermediate network nodes;

determine a current network performance characteristic associated with the first intermediate network node; and based on determining (i) that the current network performance characteristic associated with the first intermediate network node is outside of a predetermined threshold range; (ii) that the data flow associated with the first technology activity of the first technology application comprising the first data packet causes, at least in part, the current network performance characteristic to occur at outside of the predetermined threshold range, re-route one or more second data packets associated with the first technology activity of the first technology application through a second intermediate network node of the plurality of network nodes that is not associated with the first network transmission path;

wherein the second intermediate network node is associated with transmitting the one or more second data packets from the source network node to the destination network node via a second network transmission path.

19. A computerized method for individual application flow isotope tagging within a network infrastructure, wherein a computer program product is configured to construct a robotic process automation application structured to determine data flow associated with a first technology application within the network infrastructure, the computerized method comprising:

identifying a plurality of network nodes of an entity communication network, wherein identifying the plurality of network nodes comprises determining a network architecture of the entity communication network;

configuring a robotic process automation (RPA) isotope tagging application for tagging and tracking data flow associated with a first technology application of a plurality of applications of the entity communication network, based on network architecture;

transmitting, via a first operative communication link, the RPA isotope tagging application to a RPA device; and transmitting a first control signal, via the first operative communication link, to the RPA isotope tagging application, the first control signal being structured to cause the RPA isotope tagging application to initiate the tagging and tracking of the data flow associated with the first technology application;

in response to the first control signal, identifying a first data packet associated with a first technology activity of the first technology application, wherein the first data packet is structured to be transmitted from a source network node to a destination network node of the plurality of network nodes, via one or more intermediate network nodes of the plurality of network nodes;

inserting a first unique isotope tag string in at least one of a header element, a payload element, and a trailer element of the first data packet prior to transmission from the source network node of the plurality of network nodes;

initiating transmission of the first data packet from the source network node of the plurality of network nodes to the destination network node of the plurality of network nodes;

tracking, in real time, the data flow of the first technology application within network data flow of the plurality of applications of the entity communication network, wherein tracking comprises determining a current location of the first data packet based on the first unique isotope tag string; and presenting, on a display device, the current location of the first data packet in an application tracking user interface.

20. The computerized method of claim 19, wherein the computerized method further comprises:

identifying a first network transmission path that is associated with transmitting the first data packet from the source network node to the destination network node via a first intermediate network node of the one or more intermediate network nodes;

determining a current network performance characteristic associated with the first intermediate network node; and based on determining (i) that the current network performance characteristic associated with the first intermediate network node is outside of a predetermined threshold range; (ii) that the data flow associated with the first technology activity of the first technology application comprising the first data packet causes, at least in part, the current network performance characteristic to occur at outside of the predetermined threshold range, re-routing one or more second data packets associated with the first technology activity of the first technology application through a second intermediate network node of the plurality of network nodes that is not associated with the first network transmission path;

wherein the second intermediate network node is associated with transmitting the one or more second data packets from the source network node to the destination network node via a second network transmission path.

* * * * *